United States Patent [19]
Rossides

[11] Patent Number: 5,454,063
[45] Date of Patent: Sep. 26, 1995

[54] VOICE INPUT SYSTEM FOR DATA RETRIEVAL

[76] Inventor: Michael T. Rossides, 3666 Upton St., NW., Washington, D.C. 20008

[21] Appl. No.: 158,297

[22] Filed: Nov. 29, 1993

[51] Int. Cl.⁶ ................................................ G10L 5/00
[52] U.S. Cl. ................................. 395/2.84; 395/2.79
[58] Field of Search .................. 364/419.03, 419.04, 364/419.15; 395/2.69, 2.63, 2.79, 2.84

[56] References Cited

U.S. PATENT DOCUMENTS

| | | | |
|---|---|---|---|
| 4,433,392 | 2/1984 | Beaven | 364/900 |
| 5,051,886 | 9/1991 | Kawaguchi et al. | 364/200 |
| 5,228,133 | 7/1993 | Oppendahl | 395/425 |
| 5,251,131 | 10/1993 | Masand et al. | 364/419.08 |
| 5,278,980 | 1/1994 | Pederson et al. | 395/600 |
| 5,305,244 | 4/1994 | Newman et al. | 364/708.1 |
| 5,309,359 | 5/1994 | Katz et al. | 364/419.19 |

*Primary Examiner*—Allen R. MacDonald
*Assistant Examiner*—Thomas J. Onka

[57] ABSTRACT

A computer input system employing an automatic speech recognizer. The system is used for finding names in a data-base. The system reduces the number of letters a speaker needs to enter in order to find a name uniquely in the data-base. The system enables the speaker to enter inputs that identify which words in the name the speaker's letter inputs correspond to. The system builds a set of search parameters incorporating both the user's word identifier inputs and letter inputs. This set can be called an abbreviation because it usually represents a small fraction of the total number of letters in the name the user seeks to find.

5 Claims, 22 Drawing Sheets

VOICE INPUT SYSTEM FOR DATA RETRIEVAL

BACKGROUND

This invention relates to a method and system for inputting names into a computer using automatic speech recognition technology. While the field of speech recognition is full of prior art, the inventor is not aware of any art that [that] teaches the invention disclosed here. A little background is in order to explain how the invention fills a gap.

It is obvious that talking to a computer would be quite a convenient method of input in many situations. But current speech recognizers are not reliable enough to do accurate inputting of data. Currently, the reliability of the best speaker independent recognizers is around 90% at best, a rate that falls short of being practical for most uses.

Another problem, particularly regarding names, is that even the most powerful recognizers today can only recognize around 50,000 words. This number may seem like a lot, but the universe of names far exceeds 50,000, which means that a recognizable name must be part of a severely restricted list. In many applications it is impractical to severely restrict the list of possible names.

A solution would seem to be spelling so that the names themselves would not actually be recognized, just the letters in the names. The problem here is that recognizers have trouble with letters. (Letters are hard to distinguish even for humans.) Even if a recognizer is 90% accurate, it would still have [over a 50%] approximately a 47% chance of making a mistake with just 6 letters spelled. It is easy to see then why recognizers have not been used to automate of such tasks as directory assistance, where callers would spell names into a computer.

One way around this problem is to make the recognizer interactive. Thus when a speaker says, for example, the letter "A", the recognizer would output its best guess. The recognizer might return an audio message, "Did you say 'K'?" The speaker would reply, "NO," and the recognizer would then output its next best guess, perhaps "J" or perhaps "A". Eventually, the recognizer would get the letter right.

The problem here is that the method is too slow for spelling even fairly short names. The user friendliness of automatic speech recognition is lost. Therefore, conventional wisdom holds that spelling will have limited use. Indeed, despite being on the market for a several years, sales of alpha recognizers in the United States have been poor.

However, a new method and system, disclosed here, makes it possible to overcome the inherent limitations of alpha recognizers in many applications, especially those involving names.

SUMMARY

Given that alpha recognizers have limited ability to recognize letters quickly, a fruitful approach to spelling names is to abbreviate the names. With a good abbreviation method [("data compression algorithm")], a small number of letters can stand for an entire name. A practical abbreviation method must combine great user friendliness and efficient compression. The basics of such a method, and the system for implementing it, are as follows:

A speaker has in mind a name she would like to input. The speaker first chooses a word in the name to spell by identifying the position of the word in the name. The speaker then spells the word using an interactive recognizer that confirms each letter. The system allows the speaker to go to another word at any time by identifying that word by its position in the name. Because the speaker can freely choose the most unusual word(s) in the name, this method minimizes the number of letters needed to be spelled to specify a name out of a finite list of names.

As is evident, the method and system take advantage of the fact that names often have multiple words.

LIST OF FIGURES

DESCRIPTION

Introduction

Figure 1:
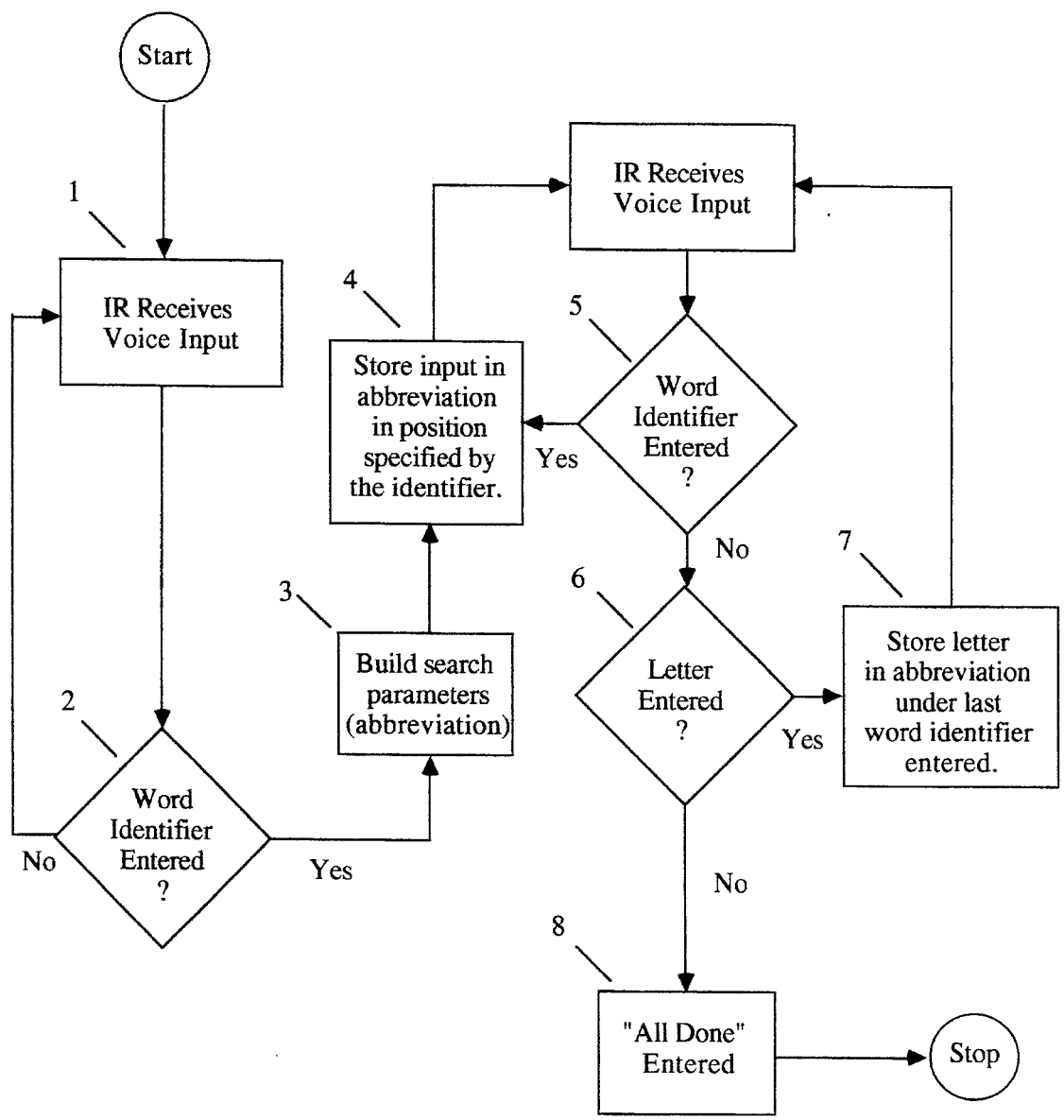
FIG. 1 shows a flow chart of the basic system for names.

The ability to input a name by voice into a computer can be useful because names are often how we label data. Disclosed here are a method and system that enable people to use automatic speech recognizers to spell names into a computer with ease, rapidity and accuracy. The method and system create abbreviations that represent names.

The purpose of inputting names is usually to find the names in a data-base. In order to find a name, a look-up system is necessary. Therefore, the abbreviation system can be combined with a look-up system which uses the abbreviations to find names in a data-base.

Most usefully, the look-up system would be interactive. Hence, also disclosed is the invention in combination with an interactive look-up system that guides the speaker in the use of the abbreviation method, so that the speaker avoids unnecessary inputs.

Organization of the Description

For easier reading, this description is divided into parts. Embodiments are included where useful. These are not meant to limit the scope of the invention but are meant only to illustrate the operation of the invention. Likewise, the figures (flowcharts) included are not meant to be definitive logic diagrams but are meant only to show the elements and steps that comprise the invention.

Part 1: Definitions.

Part 2: The basic method and system.

Part 3: Additional inputs that enhance the method and system.

Part 4: Additional functions that enhance the method and system.

Part 5: The system in combination with a look-up system.

Part 6: The system in combination with an interactive look-up system.

Part 7: The system including a multiple abbreviation function.

Part 1: Definitions

Elements:

Computer

Electronic means (hardware) for inputting, manipulating and outputting symbols.

Program

Instruction set (software) that directs the operation of the computer.

Speaker

Person (user) who inputs information into the computer by voice.

Look-up System

Hardware and software system that includes input/output means, a data-base, and a search program that takes a request for data, searches the data-base, and outputs the results of the search.

Interactive Look-Up System

Look-up system that outputs the results of a search or outputs information guiding the user as to what further information to enter in order to better specify the data sought.

Interactive Voice Response (IVR) Look-Up System

Interactive look-up system where the input/output is in voice form.

Recognizer

Means that enable a computer to have a reasonable chance of converting a speaker's speech inputs into the symbols intended by the speaker. In other words, the hardware and software that enables a computer to make a good guess as to what a speaker is saying. The recognizer for the invention must recognize letters, numbers, and certain words.

Interactive Recognizer (IR)

Recognizer that outputs its guesses to the speaker and allows the speaker to confirm or reject these guesses. If the speaker confirms the guess, the guess is registered as accurate. (The speaker may confirm a guess by not rejecting it.) If the speaker rejects the guess, the recognizer outputs its next best guess. Again the speaker confirms or rejects the guess. By a process of elimination, the IR can arrive at a guess that is accurate, an exact recognition. The IR may have an exit procedure to speed up accurate recognition. The IR may exit by asking the speaker to repeat the speech input being recognized.

Interactive Voice Response Recognizer (IVRR)

IR that outputs its guesses in voice form.

Terms:

Word

A finite string of characters (letters and possibly numbers and punctuation marks).

Name

A finite string of words. A name here is not used in the sense of a proper name. A name may have multiple proper names within it. Each of these would be considered a word. Even a whole series of proper names may be considered one name, depending on the design of a system. For example, the name of a person, his business and his address could be considered one long name. A name may also be called a single or singular name to distinguish it from a compound name (see below).

Compound Name

A finite string of names. As mentioned above, having more than one name in a full name does not necessarily mean that the full name is compound. A name with multiple names in it can be interpreted as a single name or a compound name. The designer of a system must decide which interpretation is best. For example, the full name of a product might include the manufacturer's name, the product name, and the model name (for instance, Sony Walkman MegaBass). These three together could be considered one name or three. The designer of a system would have to decide which interpretation to implement.

Search Parameters

The criteria used to identify a string of symbols or data. The search parameters are used to search a data-base for the string or data.

Abbreviation

A compressed form of a text string. The symbols in an abbreviation can be used as search parameters for the string that the abbreviation compresses. In other words, an abbreviation can be used to find a text string (name) in a data-base.

Inputs:

(Note: The inputs that follow are not all mandatory for the operation of the method and system disclosed. Only letters, word identifiers and a termination input are essential. However, the rest of the inputs can make the invention more useful. Various mixtures of the inputs can be implemented in embodiments of the invention. Also note: Several of the inputs below [are] may be considered informationally equivalent. The reason to include redundant inputs is that certain inputs are more natural to enter than others in certain situations.)

Letter

Input used to spell words. In this description of we will expand the term "letter" from the common usage. "Letter input" will include the alphabet symbols, digits, and punctuation marks that go into the character strings that makes up words.

Word

Input that is itself a full word.

Word Identifier

Input that denotes the sequential position of a word in a name. Used to specify what word a speaker's letter inputs correspond to. According to the number it contains, a word identifier specifies the position of all the letters entered after it itself is entered up until another word identifier is entered. For example, "Second word," specifies that the next letters entered are spelling the second word in a name. All letters entered for a name will correspond to that word until another word identifier is entered. The most useful word identifiers are the counting numbers: one, two, three . . . ; "Word" followed by the counting numbers: Word one, Word two, Word three . . . ; the ordinal numbers: First, Second, Third . . . ; and the ordinal numbers followed by "word": First word, Second word, Third word . . . ).

If the method and system include full word inputs, a word identifier would also specify the position of a full word. For example, "Second Word" followed by a letter would cause the letter to be placed in the second word position of an abbreviation. "Second Word" followed by a word would cause the word to be placed in the second word position of the abbreviation.

Next Word

Input that is another type of word identifier. This input denotes that the next letters entered correspond to the next word sequentially in the name being spelled. Thus a speaker could spell a letter(s) in the first word and then say "Next." The next letter(s) entered would correspond to the second word. The speaker could again say "Next" and the next letters entered would correspond to the third word, and so on.

Last Word

Another word identifier that denotes that the next letters entered correspond to the last word in a name.

Positional Letter Identifier

Input that denotes the sequential position in a word of the next letter entered. For example, "Fourth letter," would denote that the next letter entered was the fourth letter in the word being spelled.

Last Letter

Input that denotes that the next letter entered is the last letter of the word being spelled.

Second-to-Last Letter

Input that denotes that the next letter entered is the second-to-last letter of the word being spelled.

Skip Letter

Input that denotes that the speaker is skipping a letter in a word. For example, if the word is "Bill" and the speaker enters "B," "Skip Letter," "L," "L," the abbreviation would be "B_LL."

Skip Vowel

Input that denotes that the speaker is skipping a letter in a word and that the letter is a vowel. For example, if the word is "Bill" and the speaker enters "B," "Skip Vowel," "L," "L," the abbreviation would be "B vowel LL."

Skip Consonant

Input that denotes that the speaker is skipping a letter in a word and that the letter is a consonant. For example, if the word is "Bill" and the speaker enters "B," "I," "Skip Consonant," ["L,"] "L," the abbreviation would be "BI consonant [L]L."

Number of Letters in Word

Input that denotes how many letters are in the word being spelled. Or, input that denotes that the next input will denote how many letters are in the word being spelled.

Number of Letters in Name

Input that denotes how many letters are in the name being spelled. Or, input that denotes that the next input will denote how many letters are in the name being spelled.

Number of Words in Name

Input that denotes how many words are in the name being spelled. Or, input that denotes that the next input will denote how many words are in the name being spelled.

Word Done

Input that denotes that all the letters in a word have been spelled.

Words Done

Input that denotes that all the words in a name have been spelled to some extent.

Syllable Identifier

Input that denotes what syllable in a word a speaker's letter inputs correspond to. This identifier can work analogously to the word identifier. (However, this input is only noted. For simplicity's sake, it will not be discussed further.)

Name Identifier

Input that denotes what name a speaker's letter inputs correspond to. For example, "Second Name", denotes that the next letters entered are spelling the second name in a compound name. Unlike a word identifier, a name identifier would not necessarily denote sequential position. A name identifier could be descriptive, for instance, "Manufacturer", "Author", "Street", and so on.

All I Know

Input that denotes that the speaker has entered to some extent all the words the speaker knows of in a name.

Suggest

Input that denotes that the speaker requests that the system output a suggestion as to what input the speaker should enter next in order to specify a name as quickly as possible.

[Dont'] Don't Know

Input that denotes that the speaker doesn't know the input suggested.

Erase Letter

Input that denotes that the speaker is erasing the letter previously entered.

Erase Word

Input that denotes that the speaker is erasing a word previously spelled to some extent.

Erase Word Identified

Input that denotes that the speaker is erasing the word specified by the word identifier.

Erase Name

Input that denotes that the speaker is erasing a name previously spelled to some extent.

Erase Identifier

Input that denotes that the speaker is erasing the letter identifier previously entered.

Remind

Input that prompts the system to output the letters that have already been spelled in the most recently identified word.

Sure

Input that denotes that the speaker is sure of a word identifier. The input signifies that the speaker is sure of the position of a word.

Name Done

Input that denotes that the speaker has no more inputs to enter for the single (non-compound) name being spelled.

All Done

Input that denotes that the speaker has no more inputs for the single name or compound name being spelled.

Note: In practice, all inputs should sound as different from each other as possible in order to reduce misguesses by the recognizer. In this glossary several inputs, such as "Word Done" and "Words Done," sound alike. They are so labelled here only for convenience. Their actual labels when implemented in a system would vary widely. One type of input label is preferred though, the ordinal label for word identifiers, either as the ordinal numbers alone or followed by "word."

Part 2: The Basic Abbreviation Method and System

The Basic Abbreviation Method

Step 1. The speaker starts by entering the word identifier corresponding to the word in the name that the speaker will be spelling first.

Step 2. The speaker spells the word corresponding to the word identifier just entered. The speaker spells normally (by entering letters sequentially starting from the first letter). If a speaker returns to a word after having spelled it partially, the speaker continues where he left off.

Step 3. The speaker can stop spelling a word by entering one of the following inputs:

a. a word identifier, after which the speaker goes to step 2.

b. "All Done," after which the speaker stops or goes to step 1.

The Basic Abbreviation System

As shown in FIG. 1, the basic system for implementing the method above requires the following elements in combination: A computer, an interactive recognizer (IR) 1 that recognizes and confirms inputs, and a program that executes the steps below for converting the confirmed inputs into an abbreviation:

1. The program waits for a word identifier 2. After this input is entered, the program builds a set of search parameters, an abbreviation 3, for a name. The program stores [the] this word identifier input as described in the step directly below. After [the] this first :input is stored, 2. If a word identifier 5 is entered, the program the stores 4 this input in the abbreviation to specify the position of the next letters entered (until another word identifier is entered). The position is specified by the number of the word identifier.

3. If a letter 6 is entered, the program stores it 7 in the abbreviation under (in the position specified by) the last word identifier entered. Letters are stored in a word in the order they are entered.

4. If "All Done" 8 is entered, the program stores no more inputs in the abbreviation and returns to Step 1.

Some Strengths of the Method and System

The method and system are simple and therefore user friendly. Their simplicity hides power, for they allow a speaker to specify a name with a minimal number of inputs (though not an absolute minimum).

The key to this method is allowing the speaker to choose the words to be spelled in the name and to allow the speaker to change words. (The speaker may return to a word and spell more letters if he so desires.)

For example, take the name "International Business Machines". Using the normal way of spelling, a person would spell the first word first. But "International" is a common word to have first in a name. Therefore, spelling this word does not differentiate the name as much as picking "Machines," the third word ("Machines" as the third word being less common in a name than "International" as the first word).

After spelling the first, say, three letters of "Machines" the speaker might skip to another word, say, "Business." The speaker may only need to spell one letter, "B", in order to arrive at a specific enough abbreviation. In other words, the combination of "B" as the first letter of the second word and "M-A-C" as the first three letters of the third word may be enough information to specify "International Business Machines" for the purpose of the application program that uses the name.

It should be noted that the system and method disclosed are especially useful in combination with an interactive recognizer (IR). The reason is that non-interactive recognizers make guesses as to what has been spoken. Confusion can arise because these guesses are often wrong. Interactive recognizers eliminate this confusion and allow exact inputs.

Because recognizers have difficulty with letters, additional inputs such as digits can be included. A digit, for example, could signify how many words are in a name. While these kinds of inputs might not provide as much information as a letter, they may be quicker to input since the recognizer will have a better chance of recognizing the input. Numeric inputs are discussed in Part 3.

The abbreviation method and system are most useful in situations where a keyboard and screen are not available. Therefore, the most useful embodiments of the abbreviation system will include an IR that is an IVRR (interactive voice response recognizer). The recognizer will supply voice output rather than display output. In particular, the abbreviation method and system described enable the easy inputting of names through telephones that do not have keyboards and screens.

As mentioned previously, automatic inputting of names over the telephone has been blocked by the limitations of automatic speech recognizers. Therefore, the method and system in combination with an IVRR are an enabling technology that allows the phone to become a more useful terminal than it is now.

The Method and System for Abbreviating Compound Names

To allow the abbreviating of compound names, the method and system can include a Name Identifier input that signifies the name the speaker will be spelling. For example, if the compound name is made up of an author's name and a book's name, "Author" might signify that the speaker is going to spell the author's name, while "Book" might signify the spelling of the book's name. (The name identifier could be a counting number, an ordinal number, or a descriptive word.)

The addition of inputs and functions for handling compound names does not essentially change the method and system.

The method simply includes an extra step in which the speaker can signify what name she is spelling. Thus in the first step of the method the speaker identifies the name being spelled, and in the second, identifies the word being spelled. The speaker can change names by saying a different name identifier followed by a word identifier.

Figure 2:
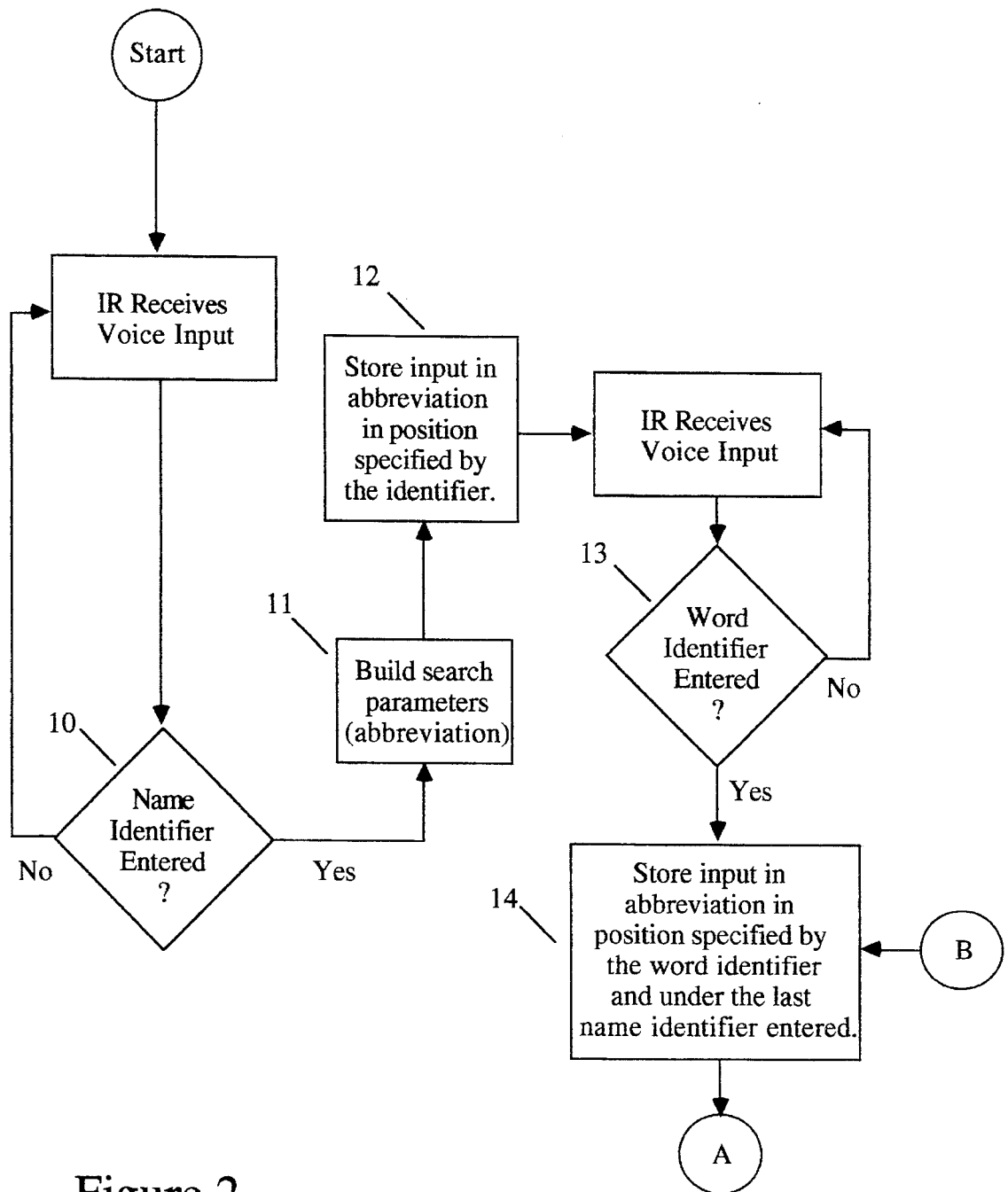
FIGS. 2–2a show a flow chart of the system for compound names.
Figure 2A:
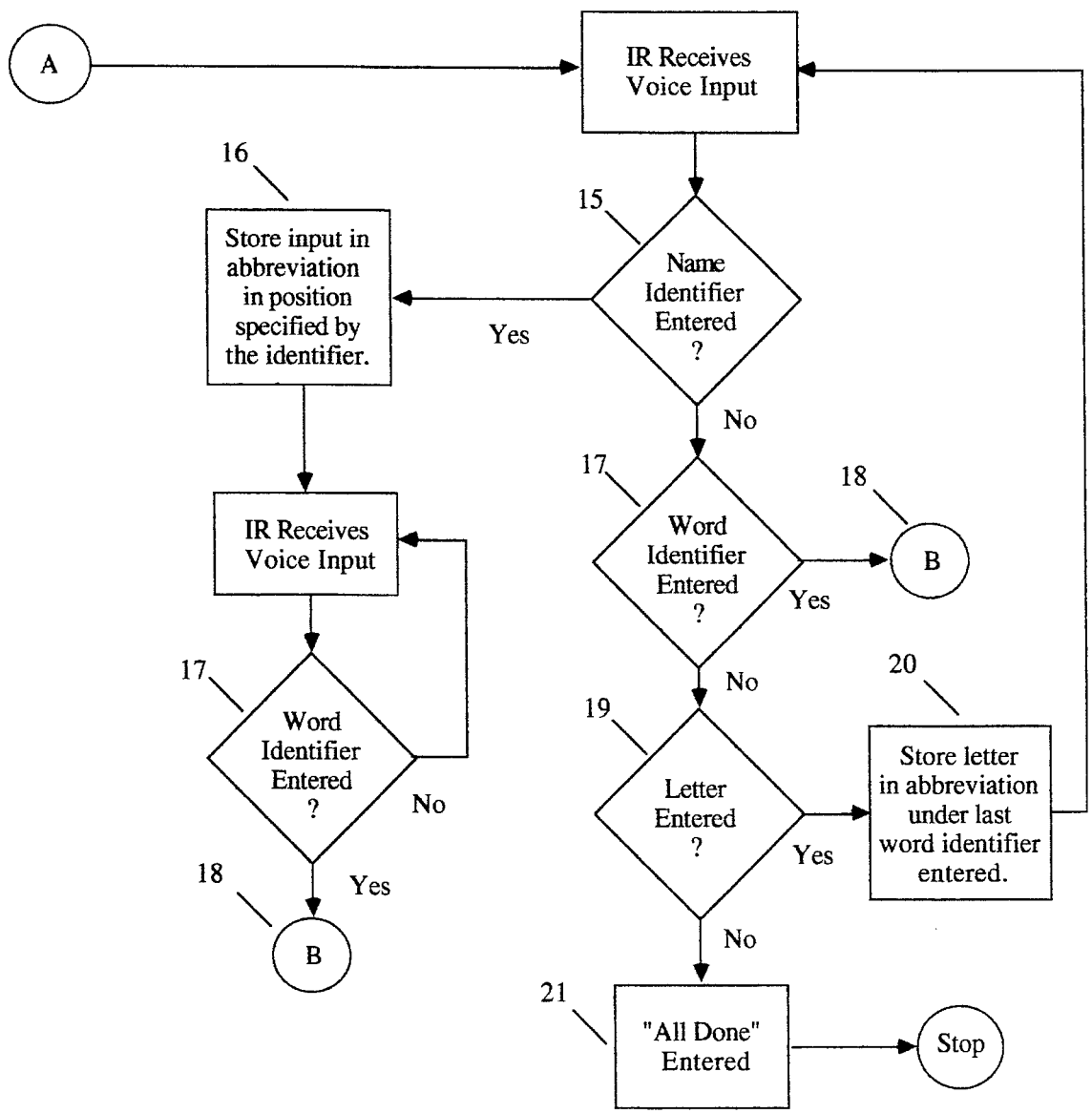

The system program simply includes a function for storing the name identifier in the abbreviation. The name identifier then specifies the word identifiers that are entered after it. The extra steps that the system requires are described below, as shown in FIGS. 2 and 2a.

1. The program waits for a name identifier 10 to be entered. After the name identifier is entered, the program builds an abbreviation 11. The program stores 12 the name identifier in the abbreviation as the specifier of all the word identifiers entered until another name identifier is entered.

2. The program then waits for a word identifier 13 to be entered. After a word identifier is entered, the program stores it 14 in the abbreviation under the name identifier just entered.

3. Then, a. If an input is a name identifier 15, the program stores it 16 in the abbreviation as the specifier of all the word identifiers entered until another name identifier is entered. The program then goes to step 2.

b. If an input is a word identifier 17, the program stores it 18 in the abbreviation under the last name identifier entered.

c. If a letter is entered 19, the program stores it 20 in the abbreviation under the last word identifier entered.

d. If "All Done" is entered 21, the program stores no more inputs in the abbreviation and returns to Step 1.

Embodiment

An illustration of the invention is given below, taking the example of a directory assistance application. We assume, of course, that the application is equipped with the abbreviation system described above.

A Speaker calls the directory assistance application and enters inputs through the abbreviation system's IVRR. The IVRR confirms each input before allowing the abbreviation program to work on that input.

The directory assistance application program continually polls the abbreviation and looks for a unique match in the application's directory of names. Once a unique match is found, the application program plays the phone number corresponding to the name.

Assume the speaker calls this directory assistance service wanting to find the number for "International Business Machines". The caller decides to spell "Machines" first.

The caller begins by saying "third word" into the IVRR 1 over a telephone line. Upon confirmation of the input, the system registers 4 that the caller will be spelling the third word in the name.

The caller then says "M" 6 and the IVRR confirms the letter and the program stores the confirmed letter in the abbreviation. The caller continues spelling "A," "C," and "H", each confirmed by the IVRR.

The caller decides to try another word and chooses "Business." The caller says "Second Word". The IVRR confirms the word identifier. The system registers 5 that the speaker has entered the identifier for the second word. The system registers 4 that the caller will now be spelling the second word.

The caller says "B". The system confirms the letter and stores 7 it in the abbreviation. The application program polls the abbreviation and finds a unique match in its directory. The application program then plays the telephone number of "International Business Machines" to the caller.

Part 3: Method and System Including Additional Helpful Inputs

Figure 3:
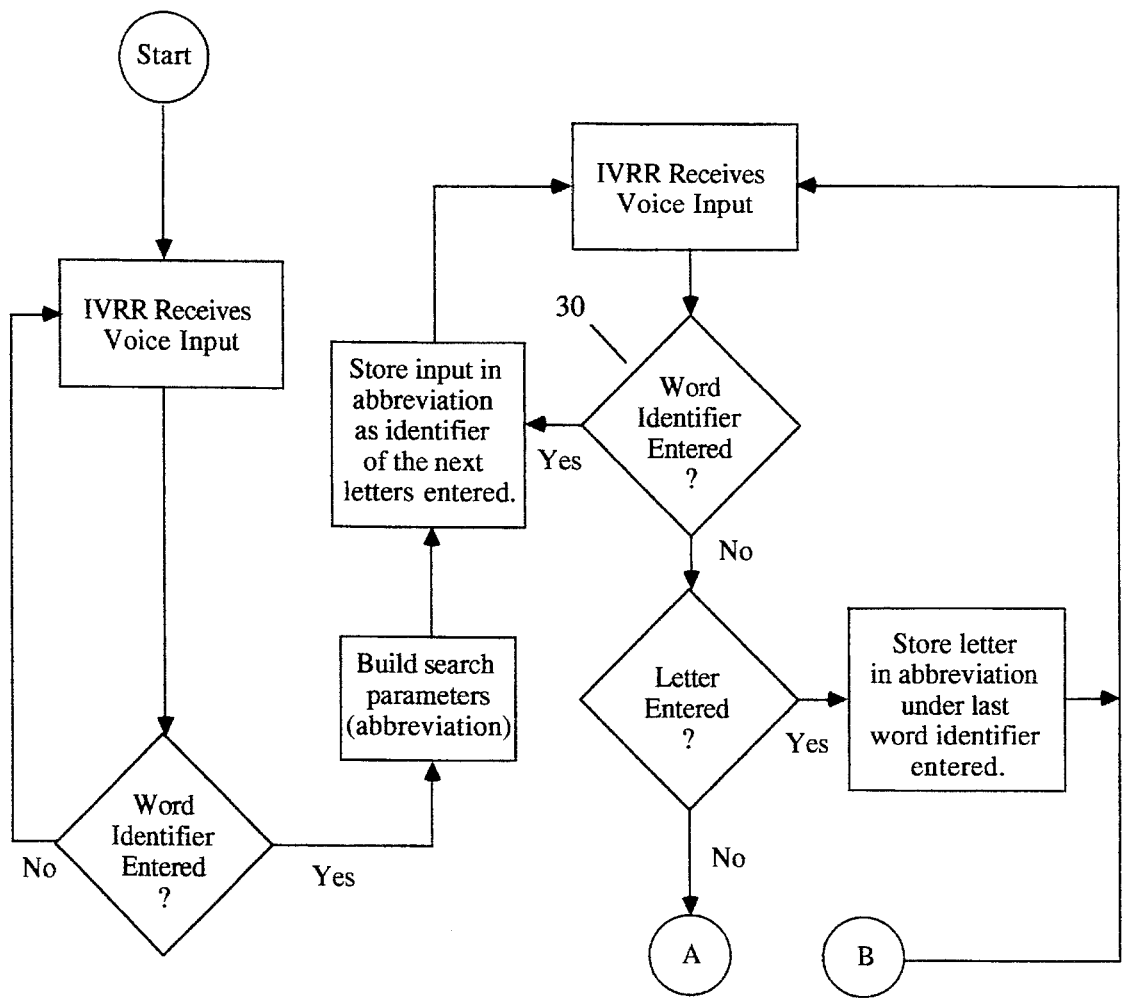
FIGS. 3–3d show a flow chart of the system including additional, useful inputs.
Figure 3A:
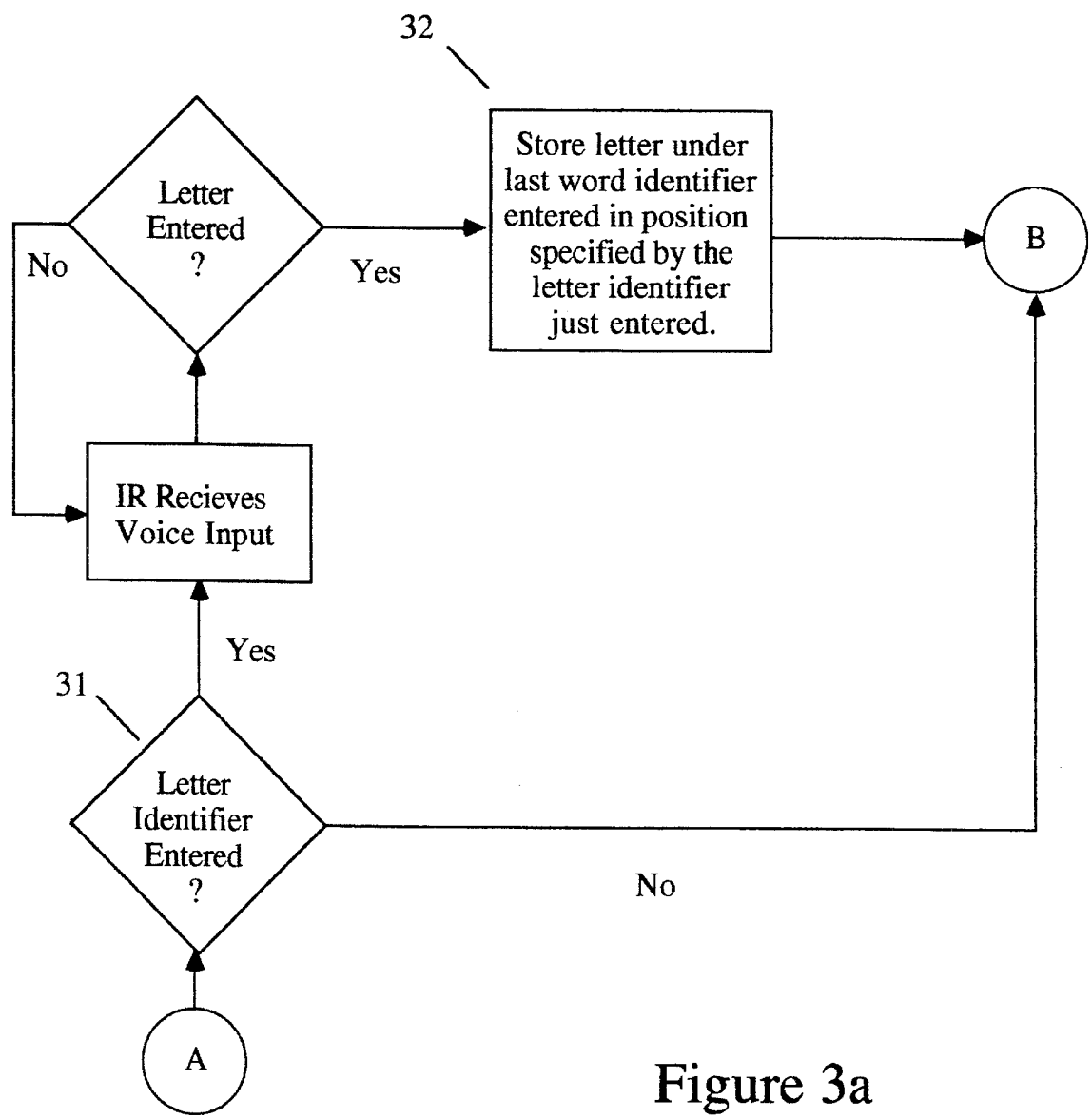
Figure 3B:
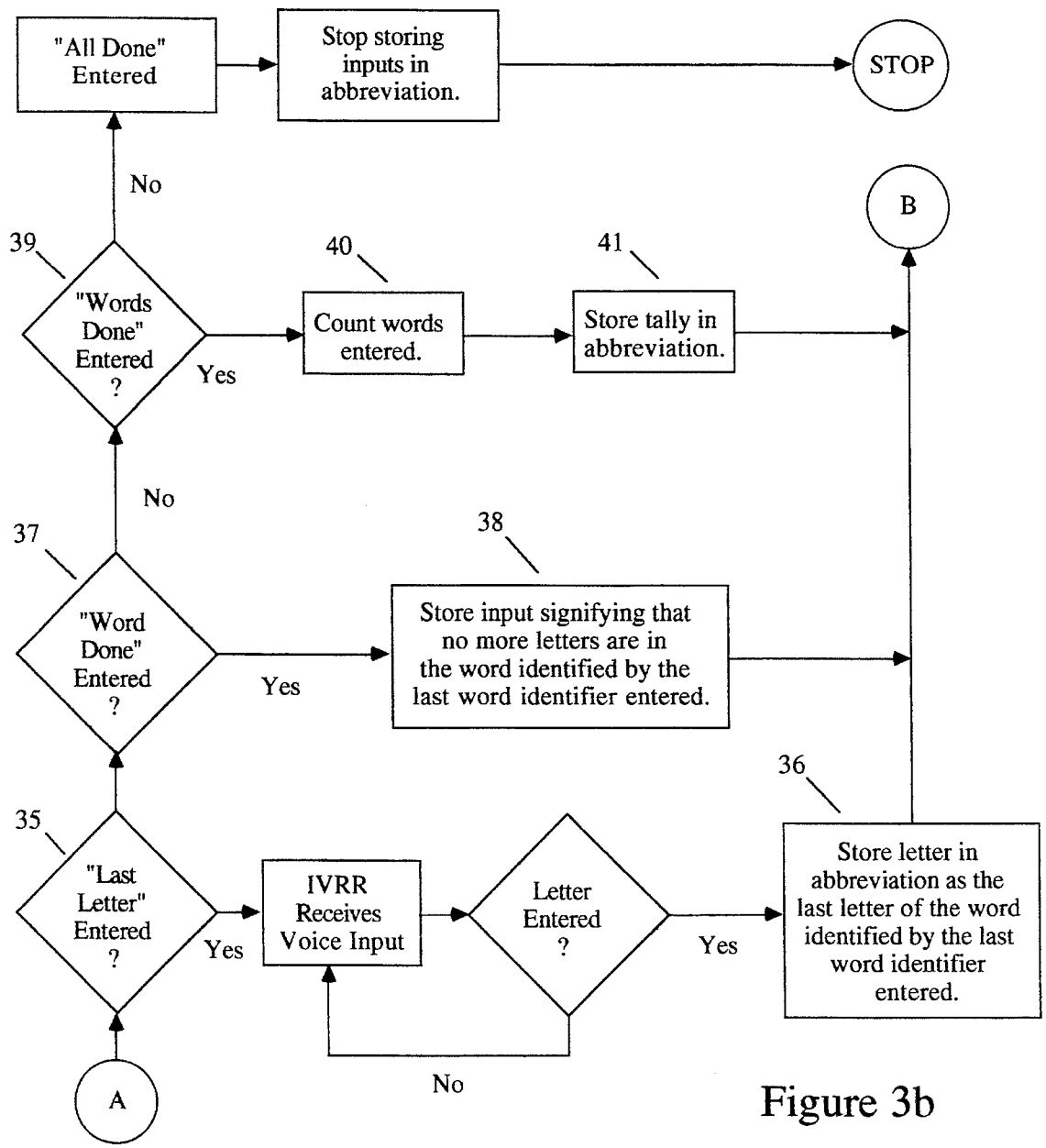
Figure 3C:
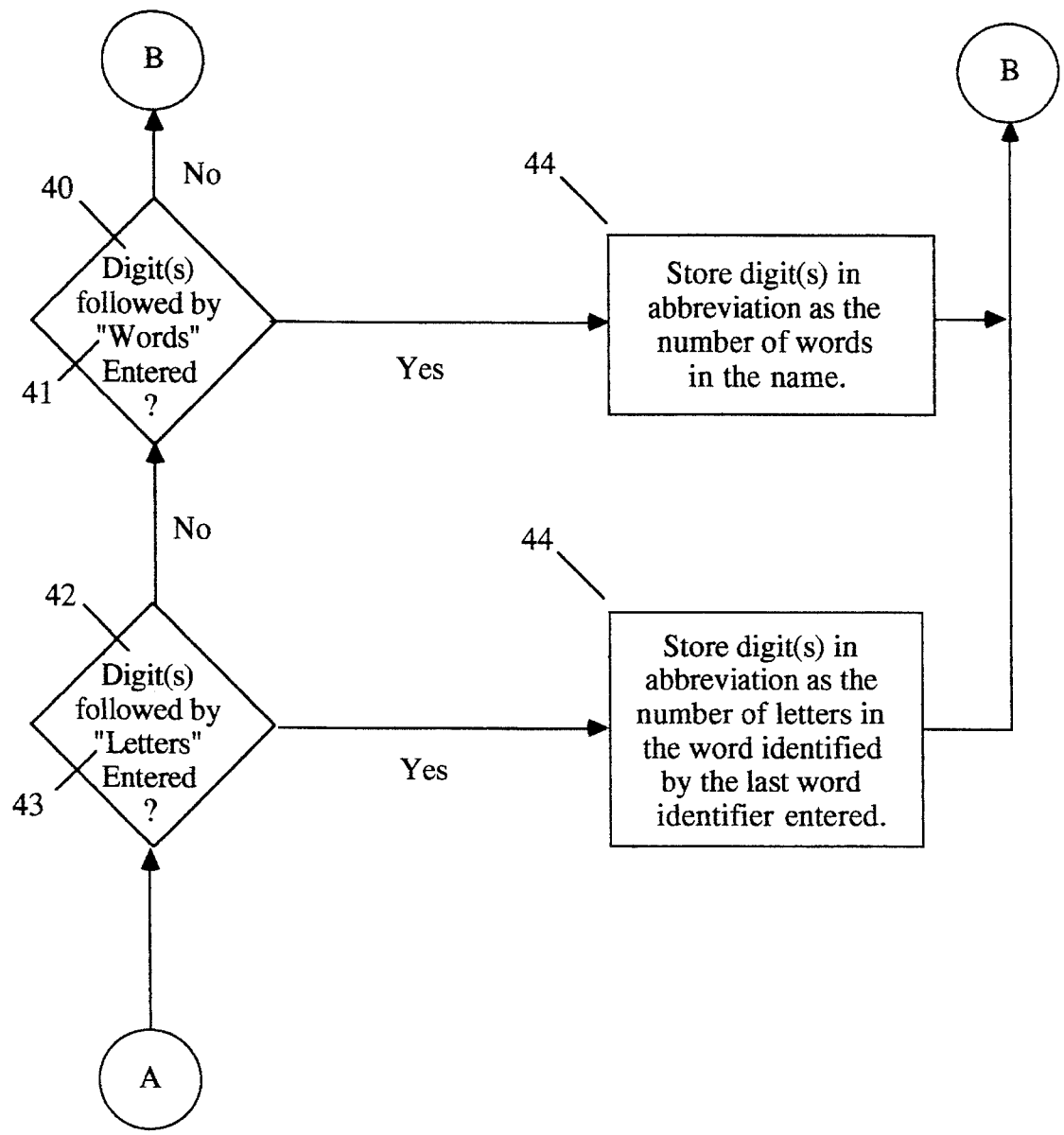
Figure 3D:
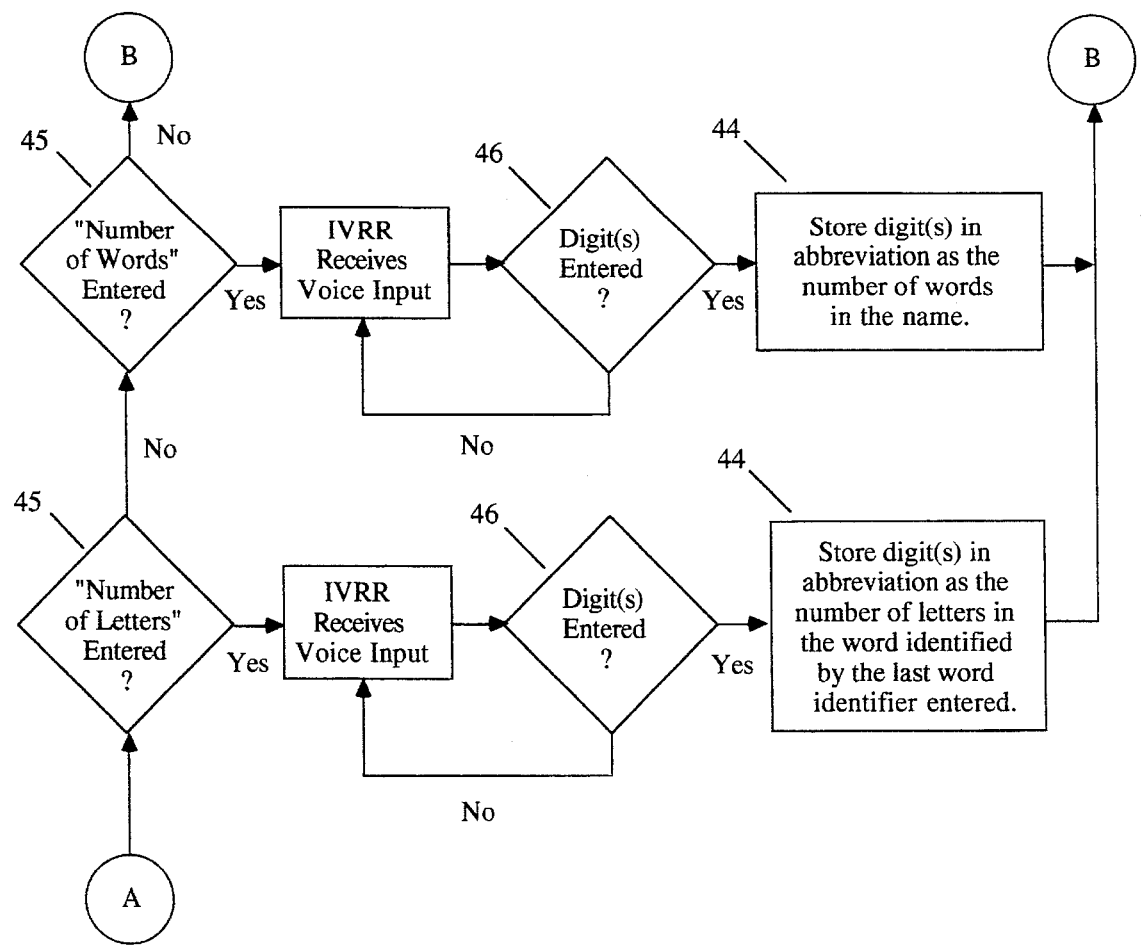

The method and system described can include a variety of helpful inputs. These are discussed below and shown in FIGS. 3 through 3*d*.

Positional Letter Identifier (referred to as "letter identifier")

The method and system can include an input that denotes the sequential position of a letter in a word. The most useful letter identifiers are those with counting numbers or ordinal numbers, for instance, "Letter three" or "Third letter."

The letter identifier is analogous to the word identifier and is nested within it. Thus, a letter identifier 31 follows a word identifier 30. For example, "Third word," "Fourth letter." The letter following the letter identifier is stored 32 in the abbreviation as specified by the ordinal or counting number in the letter identifier. For example, a person spelling "Rocklands" might say, "Fourth letter," "K." "K" is then stored as the fourth letter of the word being spelled.

The system program normally defaults to the assumption that a speaker will start spelling a word from the first letter. But after a letter identifier is entered, the program assumes that the speaker will continue spelling sequentially from the point of the letter identifier. The next letters entered for the word are stored sequentially following the last letter stored. Thus, for example, the program stores the letter entered after, say, "Fourth letter," "K" as the fifth letter in the word.

Naturally, the abbreviation program could be designed to assume that the speaker will be returning to the point he was at before entering the letter identifier. In this case, the next letters entered for a word are stored sequentially following the letter entered before the letter identifier was entered. If no letter had been entered before for that word, the program defaults to assuming the speaker is entering the first letter of the word.

Last Letter

The method and system can include an input, which might be called "Last Letter," that denotes that the next letter entered is the last letter of the word being spelled. When "Last Letter" is entered 35, the system program registers that if a letter is entered next, the letter is to be stored as the last letter 36 in the last word identified. This letter is not necessarily the last letter to be entered for the word just the last letter in the word. For example, a speaker might be abbreviating the word "Flower" and say, "F," "L," "Last Letter," "R." The speaker might then, if necessary, spell more of the word starting after the "L."

After "Last Letter" and a letter are entered, the next letters entered for a word are stored sequentially following the letter entered before "Last letter" was entered. If no letter had been entered before for that word, the program defaults to assuming the speaker is entering the first letter of the word.

(The same basic method applies to an input denoting that the next letter to be entered is the second-to-last letter in a word.)

Skip Letter, Skip Vowel, and Skip Consonant

The method and system can include an input, which might be called "Skip Letter," that denotes that the speaker is skipping spelling a letter in a name. When the speaker enters this input, the system stores a null letter (blank character), instead of a normal letter, in the abbreviation.

The method and system can also include an input, which might be called "Skip Vowel," that denotes that the speaker is skipping spelling a letter in a name and that the letter is a vowel. When the speaker enters this input, the system stores a symbol in the abbreviation that denotes a vowel. The symbol takes the place of a normal letter.

The method and system can also include an input, which might be called "Skip Consonant," that denotes that the speaker is skipping spelling a letter in a name and that the letter is a consonant. When the speaker enters this input, the system stores a symbol in the abbreviation that denotes a consonant. The symbol takes the place of a normal letter.

There are a few reasons these inputs can be useful. First, the inputs are easier for a recognizer to accurately recognize. Second, they provide information. Third, they allow the speaker to quickly get to a letter that has high information content. For example, if a speaker is abbreviating "Feynman," the speaker could probably specify the name faster by entering "F," "Skip Vowel," "Y" than by entering "F-E-Y." The "E," which usually has little information content, on average takes more time (because of recognition difficulties) than "Skip Vowel." The "Y" usually has a much higher information content than the "E" and therefore the speaker would be right to get to the "Y" as quickly as possible.

Word Done

The method and system can include an input 37, which might be called "Word Done," that denotes that all the letters in a word have been spelled. The system program stores 38 this input in the abbreviation under the last word identified. ("Word Done" [is] can be equivalent to an input explicitly denoting how many letters are in a word.)

Words Done

The method and system can include an input 39, which may be called "Words Done," that denotes that all the words in a name have been spelled to some extent. This input [is] can be equivalent to an input explicitly denoting how many words are in the name being spelled. Thus, upon registering this input, the system program can count 40 the words spelled in the abbreviation and store 41 the tally in the abbreviation.

Numeric Value Inputs

The method and system can include numeric value inputs that denote the number of letters in a word, the number of words in a name, and the number of letters in a name.

These values can be entered in many ways. A system program can include more than one way. (As noted above, the inputs "Word Done" and "Words Done" give numeric information but not with numeric inputs.) Four ways are described below using numeric inputs.

A numeric input has two parts, a number and a description telling what the number applies to. The program registers the descriptive part and then stores the number as the descriptive part specifies. Of course, the program must be designed to recognize the descriptive part which, as mentioned, can vary. The four ways described below differ in the form of the descriptive part.

1) By explicit input, where the descriptive part is explicit. In this case, the numeric part 40 and descriptive part 41 may be combined in one input. For example, "Five words," or "Six letters 42, 43." Another variation is for the descriptive part 45 to be entered first followed by the numeric part 46. For example, "Number of Letters" followed by "Six." The program stores 44 the number as specified by the descriptive part.

2) By prompt, where the system prompts the speaker to give a numeric value. The prompt is the descriptive part. After a prompt, the value entered is stored as specified by the prompt (see Part 5, Interactivity).

3) By sequential order, where the speaker has the option of entering a numeric value after a certain other input has been entered. The method and system can be designed to follow a convention whereby after a certain input, the speaker can enter an identifier, a letter, or a digit. If a digit, the digit is one of the three numeric values above. For example, after a word identifier, a digit could denote the number of letters in the word just identified. For example, "Second word," "Four" would denote that the next letters entered belonged to the second word and that the word had four letters. Likewise, after a name identifier, a digit could denote the number of words in the name.

It is also possible to have multiple digits where each digit denotes a different piece of information about the name. For example, a speaker could begin by saying, "two, three, seven." The "two" could denote that there are two words in the name. The "three" could denote that the next letter(s) spell the third word in the name. And the "seven" could denote that there are seven letters in the third word. (One of the advantages of using digits is that recognizers are much better at recognizing digits than letters). It is also possible to use one number where each digit denotes a different piece of information about a name. Thus, "two hundred and thirty-seven" rather than "two, three, seven."

In the case of entering numeric inputs according to the order the inputs are entered, the order itself is the descriptive part.

4) By word identifier code, where a word identifier denotes more information than just the position of a word in a name. Such a coding method introduces imaginary, null words into a name. These null words can go in front of the real words or can be interspersed between them. If in front, the sequential order of the real words is preserved. If in between, the order of the real words is preserved. From the example above, a speaker could use the word identifier "237th" word which would be equivalent to "237." The system program would be designed to recognize the code in order to store the numeric part of the input. The possible codes are infinite.

When a word identifier carries an extra piece (or pieces) of information, a step(s) of confirmation by the recognizer is avoided. After the first word identifier is entered for a name, the speaker can return to using single digit, ordinal word identifiers such as "First," "Third," etc.

(Aside: A person can introduce imaginary, null words into a name in order to distinguish that name from others. For example, John Smith might want to distinguish his name from other John Smith's. Therefore he could list himself in a directory under "John Smith +7." The +7 would mean seven null words would go in front of his name. Thus he could be looked up under "Eighth word," "J," "O," "H," etc. Using null words in this way can lead to faster specification than adding a new, real word, such as a "7," to the end of a name. The new, real word would require an extra step to identify.)

Embodiment

Taking the directory assistance example used previously, assume again that the speaker calls this directory assistance service wanting to find the telephone number for "International Business Machines."

The caller begins by saying "Three words" 40, 41 into the IVR a telephone line. Upon confirmation of the input, the system program registers 44 that the name has three words.

The caller then says "Second word," "Fourth letter" 31. The program registers 32 that the next letter will be for the second word and that it will be the fourth letter of the second word.

The caller spells "H-I." The program stores these letters as the fourth and fifth letters respectively of the second word.

Assume these inputs are enough to specify the name uniquely.

Now, assume "International Business Machines" is also listed under "IBM." And assume the caller seeks to find the name "IBM."

The caller says, "First word," and then spells "I-B-M."

The caller then says "Word Done" 37. The program registers that there are no more letters in the word and stores this information in the abbreviation.

The caller then says "Words Done" 39. The program registers that there are no more words in the name and stores this information in the abbreviation.

Assume these inputs are enough to specify the name uniquely.

Part 4: Helpful Functions

The abbreviation system can include the following functions as enhancements, as shown in FIGS. 4 through 6b.

Erasure Functions

The method and system can include a step and function with which the speaker can erase a previous input or inputs. The erasure could be at the letter, word, or name level. "Erase" followed by any input can signify that that input is to be erased from the abbreviation.

Figure 4:
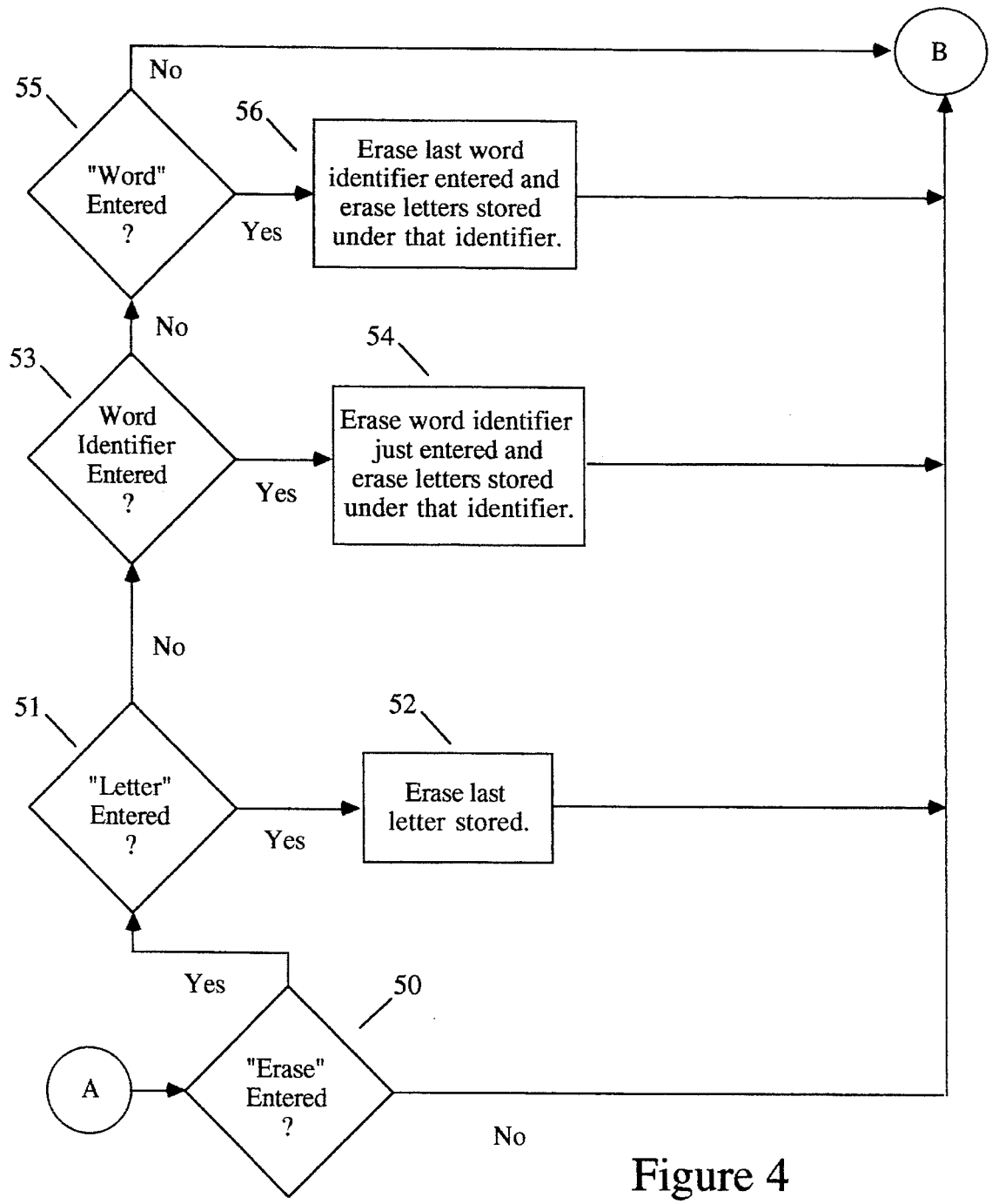
FIG. 4 shows a flow chart of the system including erasure functions.

As shown in FIG. 4, an input, call it "Erase" 50, followed by "Letter" 51 directs the program to erase 52 last letter stored. "Erase" followed by a word identifier 53 directs the program to erase 54 the letters stored under that identifier. "Erase" followed by a name identifier (not pictured in any figure) directs the program to erase the letters and word identifiers stored under that name identifier.

The program can include a default procedure that assumes that if a speaker says "Erase Word" 55 without specifying the word, the word to be erased 56 is the last word being spelled. Likewise, "Erase Name" directs the program to erase the name being entered. There are other ways to implement an erasure (correction) function in this abbreviation method but they are essentially the same as the ways described above.

Default to First Word

Figure 5:
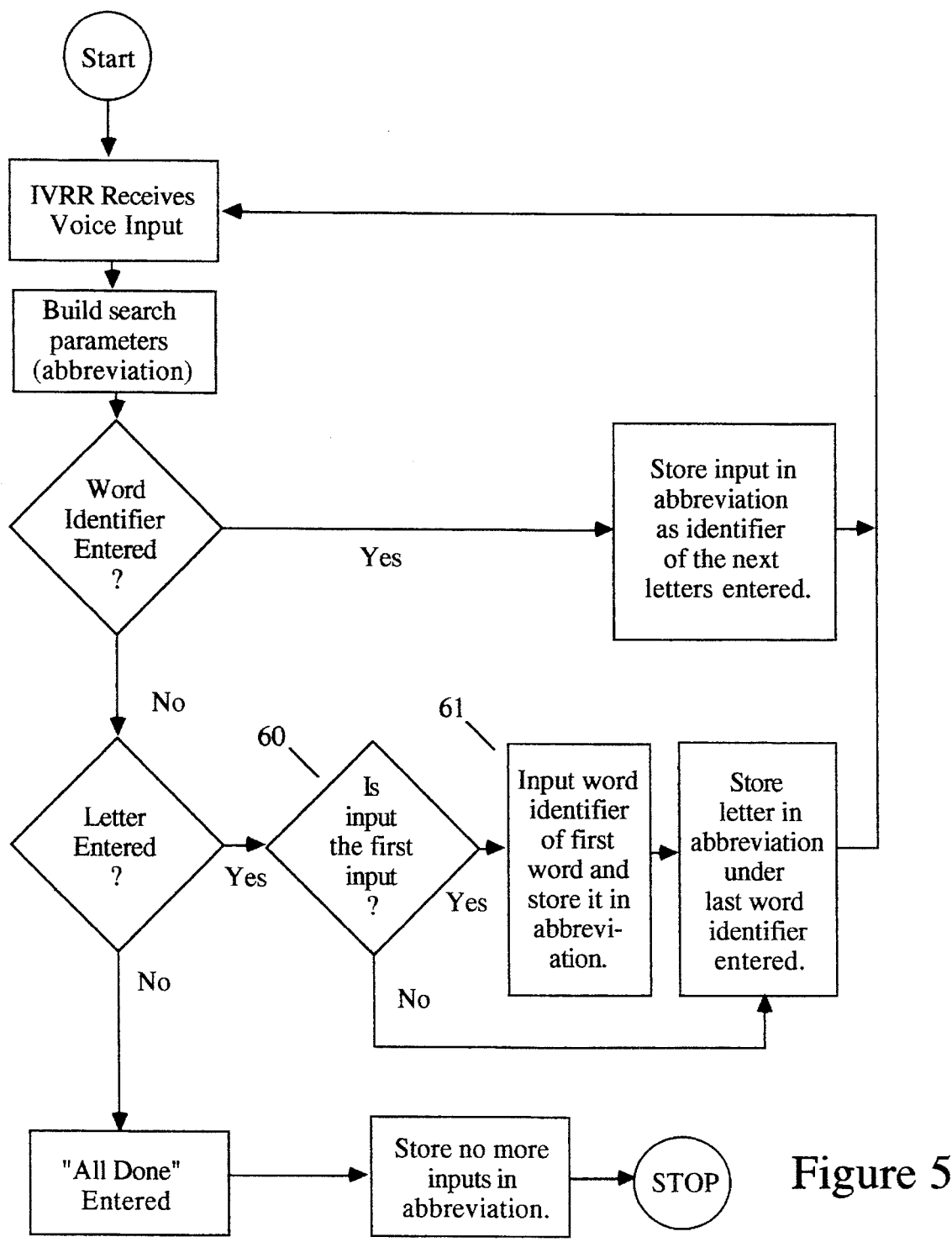
FIG. 5 shows a flow chart of the system including a useful default.

The system program can include a default procedure that assumes that the speaker will start by spelling the first word of a name, unless otherwise indicated by a word identifier. As shown in FIG. 5, if the first input is a letter 60, the default procedure stores 61 the letter in the abbreviation under the word identifier for the first word. In other words, the program defaults to assuming that the identifier for the first word has been entered before the letter was entered.

Default to First Name

The system program can also include a default procedure that assumes that the speaker is spelling a certain name first, unless otherwise indicated by a name identifier.

Re-Spelling Function

The abbreviation method and system allow a speaker to return to a word that has been previously spelled to some extent and spell more of it. The system as described above has the speaker pick up where she left off because letters are stored sequentially in an abbreviation in the order they are entered. However, it may be easier for a speaker to start at the beginning of a word rather than try to remember her place. In this case it would be faster not to have to have the recognizer confirm letters that have already been confirmed. A function for eliminating reconfirmations is described below that allows a speaker to start from the beginning of a word.

Figure 6:
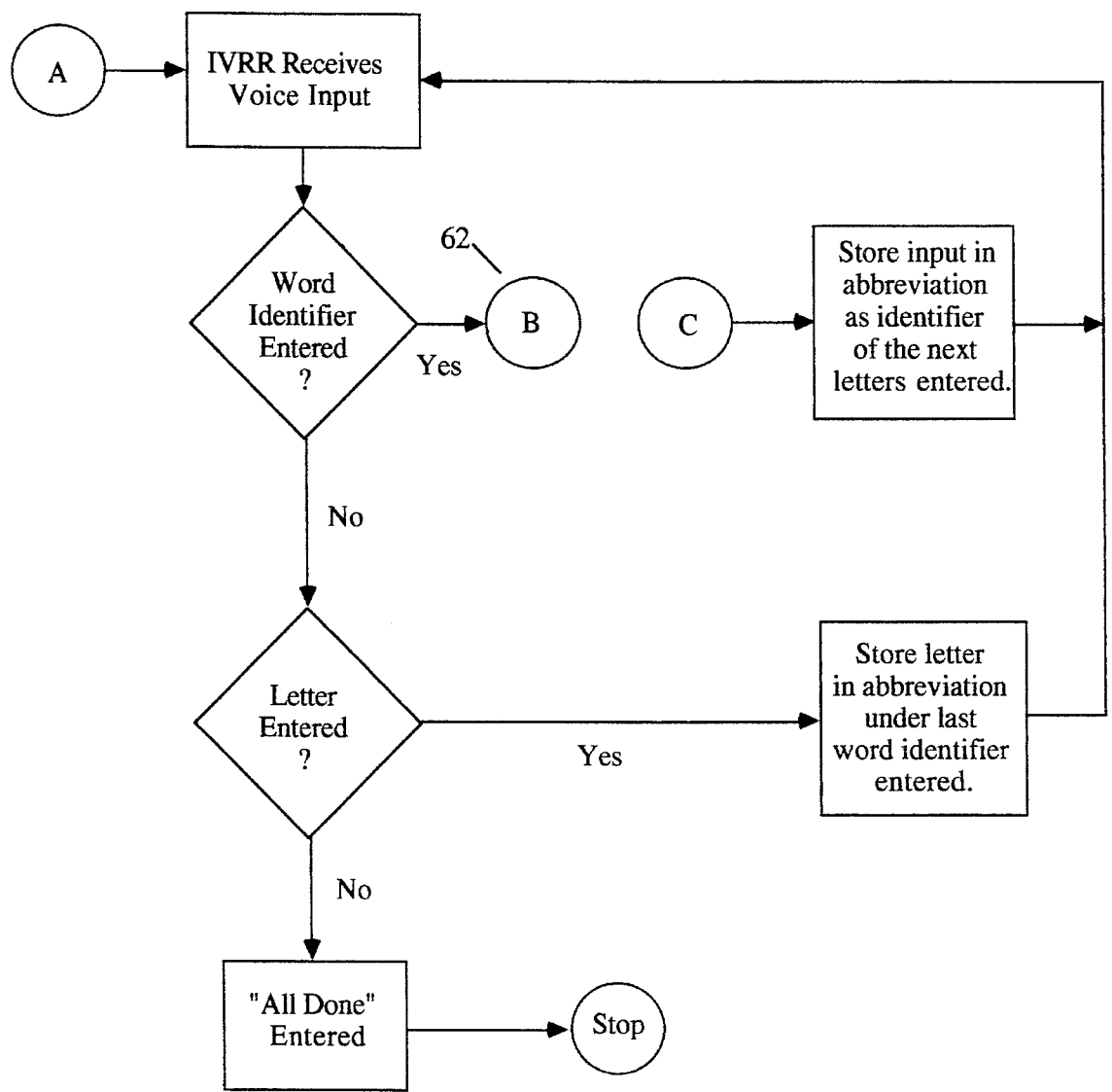
FIGS. 6–6b show a flow chart of the system including re-spelling and reminder functions.
Figure 6A:
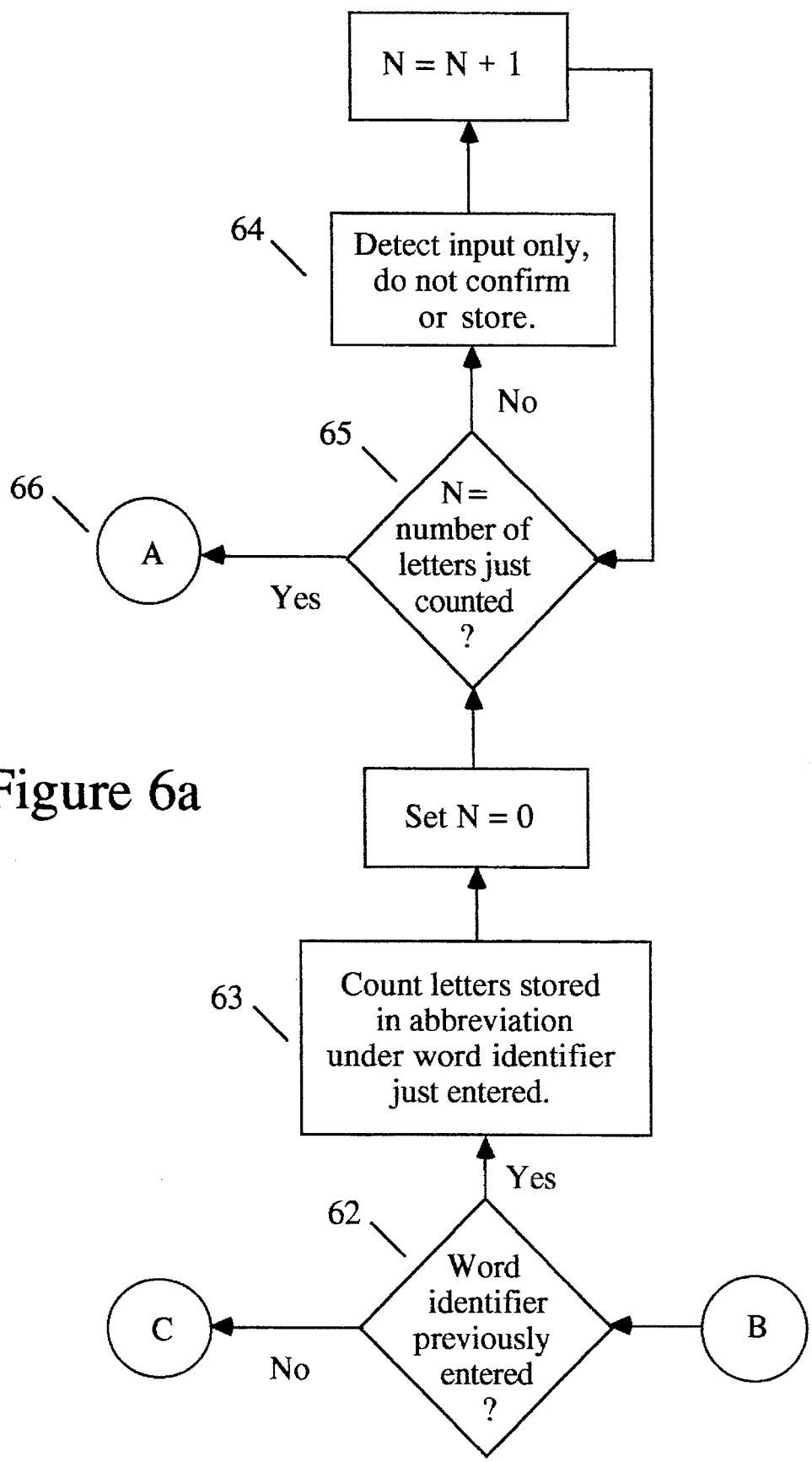

As shown in FIGS. 6 and 6a, after a speaker enters a word identifier that has been previously entered 62, the system program counts 63 the letters already spelled for that word. The program then detects 64 the speaker's next inputs. However, the program directs the IVRR not to confirm inputs but only to detect them 64. The program stops storing inputs as well 64. After detecting as many inputs as there are letters already spelled 65, the program allows the IVRR to confirm inputs and the program stores them as usual 66.

Reminder Function

A speaker returning to a word might prefer not to have to re-spell letters. Yet the speaker may also need to be reminded of where he left off. A function for reminding the speaker is described below.

Figure 6B:
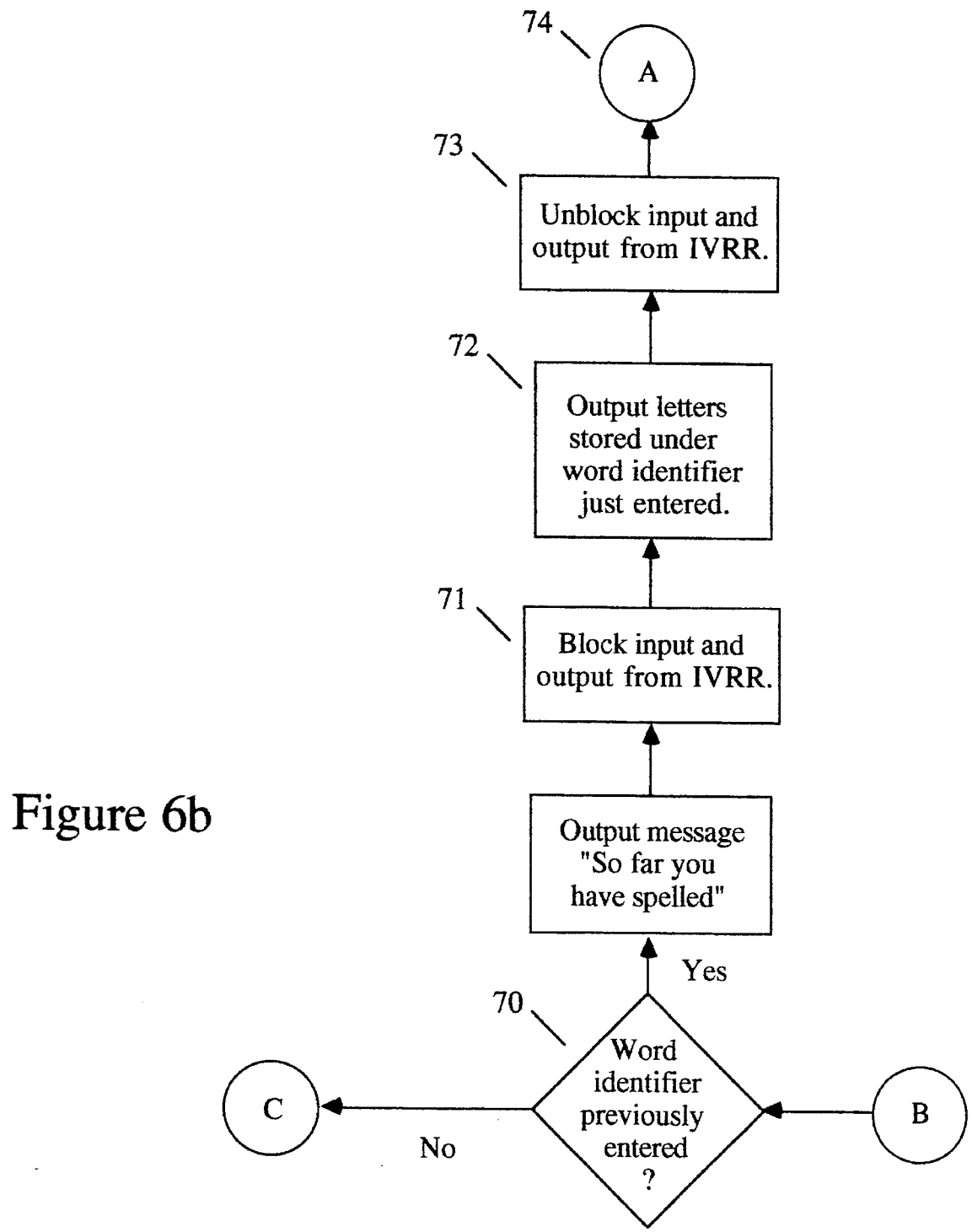

As shown in FIG. 6b, after a speaker enters a word identifier that has previously been entered 70, the system program blocks inputs and outputs 71 from the IVRR and outputs 72 all the letters in the abbreviation under that word identifier. [During this output,] After this output, the program unblocks the IVRR 73. The program then stores 74 letters normally (in sequential order following the last letter already stored in the word).

This function can be invoked in other situations where the speaker might be confused about what he has spelled. It can also be invoked by an input, which might be called "Remind." "Remind" followed by a word identifier would output the letters stored under that word identifier. "Remind" followed by a name identifier would output the word identifiers stored under that name along with the corresponding letters.

Note: If a system program includes a letter identifier input, the program must also have a default procedure determining where the speaker starts when re-spelling a word that has been partially spelled using the letter identifier. For example, if the word being spelled is "Rankle" and the speaker has already spelled "Fourth letter," "K," and is then returning to the word, the program can store letters in order after the "K" or starting with the "R." Though it seems preferable to start from the beginning part, either way is acceptable.

Full Word Acceptance Function

While the method and system are designed to allow the speaker to abbreviate words and ultimately names, the method can include full word inputs. Thus a speaker abbreviating "Reggies Bowling Alley," might enter "First Word," "R," "Second Word," "Bowling," "Third Word," . . . .

The recognizer, of course, would have to be able to recognize a vocabulary of full words in addition to those words used as program inputs (such as "First," "Word Done," etc.). Words that are program inputs would not be stored in the abbreviation.

To accept word inputs as well as letters, the system program would include a function that stores full words. After a speaker enters a word identifier, if the speaker then enters a word that is not a [word] program input, the word is stored in the abbreviation in the position specified by the identifier. No more letters are stored in that word position. Further, if letters have already been stored in that position, they are erased and replaced with the word.

Embodiment

Taking the directory assistance example used previously, assume again that the speaker calls this directory assistance service wanting to find the telephone number for "International Business Machines."

The caller begins by saying "I." The system program includes a default procedure 60, 61 that causes the "I" to be stored under the first word in a name.

The speaker then says, "third word," "B." The program stores these as specified. The speaker realizes he has made a mistake and says, "Erase Word" 55. The program erases 56 the word most recently stored.

The speaker is now a bit confused and says "First word." The program registers that the word has been entered previously 70 and outputs 72 the "I."

The speaker continues spelling "International."

Part 5: Abbreviation System in Combination With a Look-up System

The key use of the method and system described in the preceding sections is to create an abbreviation that can be used to find a name in a data-base. The name itself would correspond to some data, the ultimate aim of the search. Once the name is found, the data can be outputted. Therefore, the abbreviation system should be combined with a look-up system that includes: a) a data-base, b) a program for using the abbreviations created to search the data-base, and c) functions for outputting the results of the searches.

Figure 7:
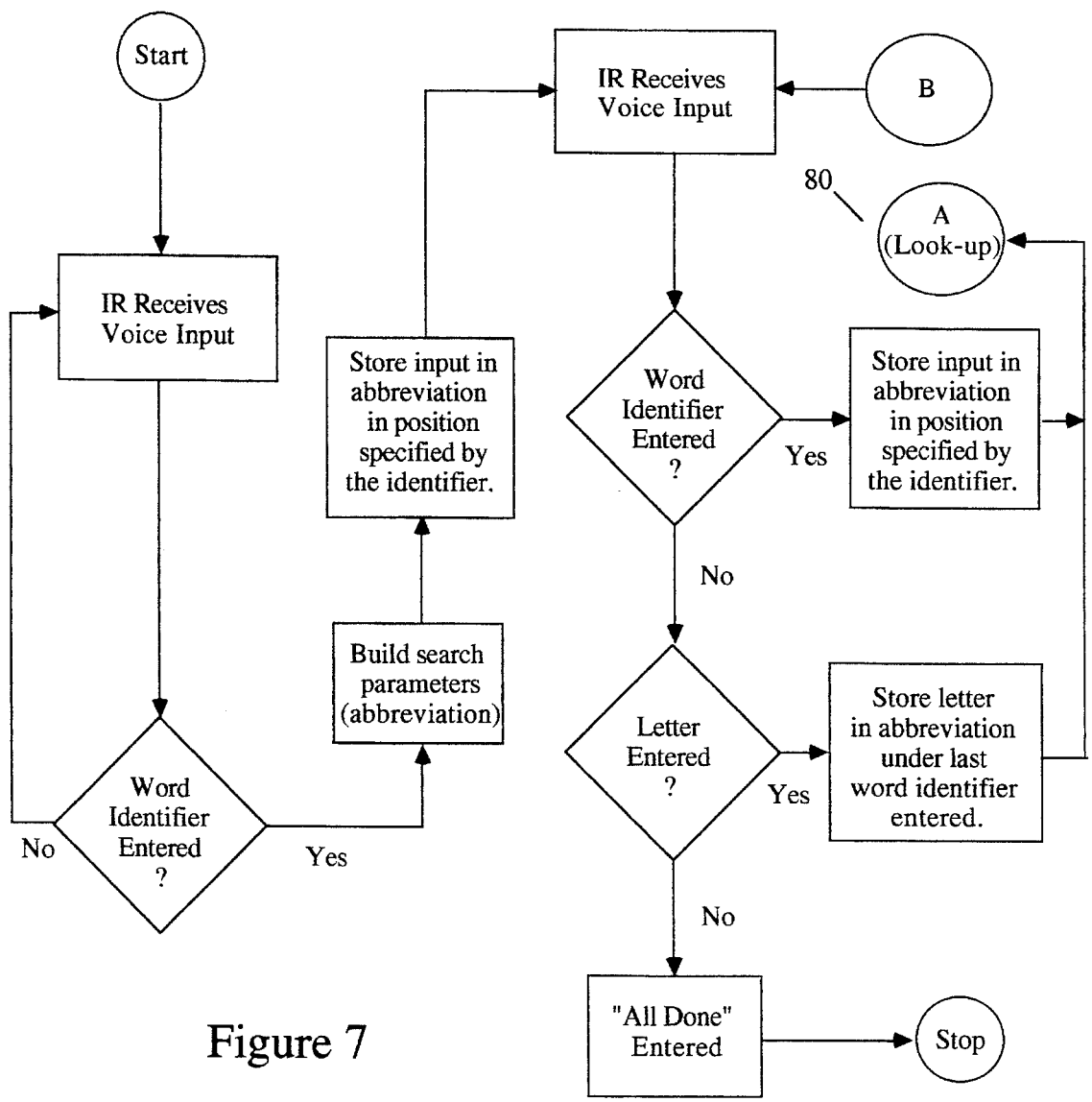
FIGS. 7–7a show a flow chart of the system in combination with a look-up system.
Figure 7A:
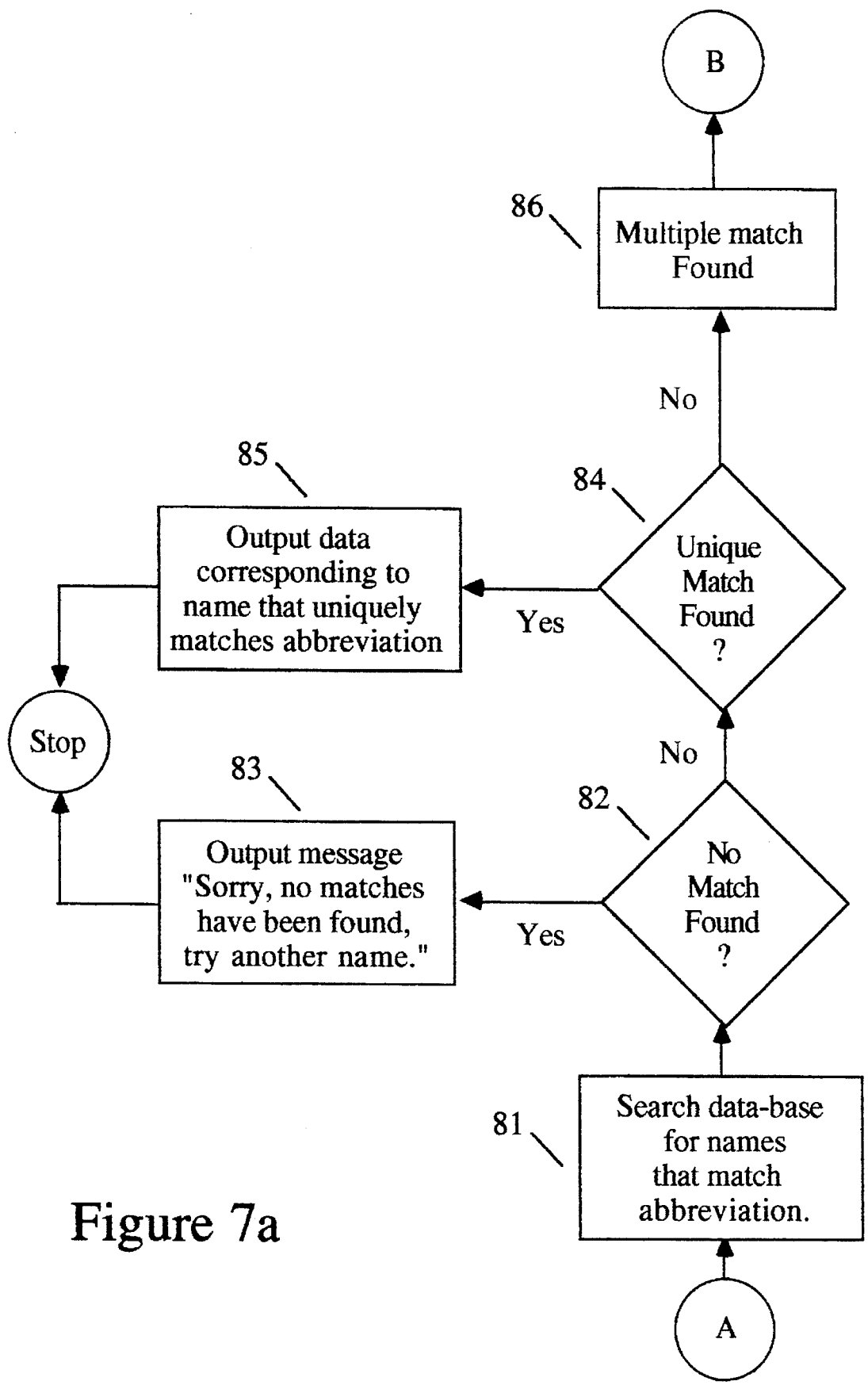

This combined system would execute the same steps as the abbreviation system described above with the steps of the look-up system being added as follows:

As shown in FIGS. 7 and 7a, after the abbreviation program stores an input in the abbreviation, the search program polls 80 the abbreviation to search 81 the data-base for a name that uniquely matches the abbreviation.

If no match is found 82, the output function outputs a message 83 that the data could not be found, If a unique match is found 84, the output function outputs the data 85 corresponding to the name, If a non-unique match is found 86, the abbreviation program waits for more inputs.

Most inputs can potentially add information to the abbreviation for the purpose of matching a name. For example, even a word identifier, such as "fourth word," can contain information because it tells that the name has a fourth word. Certain inputs, of course, do not provide information that can be used in a search.

After a "no data" message, an erasure input could be entered, allowing the speaker to alter an abbreviation without starting all over.

For faster searching, the names in the data-base can include information denoting the number of words in the name, the number of letters in the words, etc.

Best Match Function

As the steps above show, when a mismatch is reached, the system outputs a "no data" message. However, it should be noted that the system may include a "best match" function that outputs the best match for the abbreviation. This type of function would be invoked usually if the speaker had entered a certain number of inputs. For example, if a speaker has specified the name and model of a product but had entered a model number that did not match the model number in the data base, the system program could output the model number that matches best.

Functions for Confirming Names

When the look-up program finds a name uniquely matching the abbreviation, the program can output the data corresponding to that name. But, two problems can arise. One, the speaker may have made a mistake in abbreviating the name and so the data will not be the data sought. Two, the name the speaker abbreviates might not be in the database, yet the name's abbreviation might still match a name that is in the data-base. That's because different names can have the same abbreviation. For instance, the speaker might be looking for the phone number of "John's Pizza." The speaker might abbreviate this name as "First Word," "J," "Second Word," "P-I-Z." This abbreviation might match one name in the system data-base, but the name might be "Joe's Pizza."

Because of potential confusion arising from mistakes and false matches, the look-up system can include a procedure for confirming that the name found is the name sought. The steps of the two basic functions for confirmation after a name has been found are:

1. a) the name is outputted, b) the speaker is given a chance to reject the name, c) if no rejection is entered, the data is outputted.

2. a) the data is outputted, b) the name is then outputted.

Speaker Ignorance

When using an abbreviation method to look-up a name, the speaker will usually not know enough about the name and about other names in a data-base to differentiate the name from the other names with a minimum number of inputs. In other words, ignorance leads to entering unnecessary (redundant) inputs. It also can lead to dead-ends, in which a speaker is stuck at a multiple match because he does not know enough to create an abbreviation that matches a unique name.

Therefore, it is useful for the look-up system to include interactive, guiding functions that reduce redundant inputs. If the speaker knows enough about the name he is abbreviating, these functions will guide him to find a unique match in less time than he would ordinarily take. If the speaker does not know enough to find a unique match, these functions will inform him of that fact and guide him, in less time than he would ordinarily take, to find the smallest number of matches possible, given what he knows about the name.

Once the speaker has hit a dead-end, various functions can exit that dead-end. These will be described before interactive, guiding functions are described because the interactive functions are more complicated, and because exits are needed whether or not a system includes interactive guides.

Exits: Output Functions for Incomplete Abbreviations

A speaker may not have enough information to differentiate a name from others. For example, if the speaker is seeking the phone number of a certain McDonalds but has no address information then the speaker cannot differentiate one McDonalds from any other. An abbreviation is "incomplete" if it does not contain enough information to uniquely specify a name in a data-base.

The look-up system should include a function or functions that outputs a message when a speaker has entered an incomplete abbreviation and has reached a dead-end, has decided that he cannot further specify the name. Such functions can be called exits and various exits are possible in a system.

An exit is invoked when the speaker enters a termination input such as "All Done." (It is possible for the look-up program to default to a termination after a certain number of inputs have been entered.) Some exits suited to the abbreviation method are described below. A system can include one or more of these functions.

When a speaker has entered "All Done" or an equivalent input and still no unique match for a name has been found:

a) The look-up program can output nothing (or a message that there are too many names matched to give any data).

b) The look-up program can select the data associated with one of the matched names at random and output that. For example, if a person is looking for the telephone number of McDonalds and the system database has ten McDonalds listed, the system might output the phone number of one, on a random basis.

c) The look-up program can select the data associated with the name that has been requested most. For example, if the phone number of a certain McDonalds has been sought by 50% of the speakers who were able to specify addresses, the system could output the phone number of this McDonalds to speakers who cannot specify addresses. The look-up program would keep a tally of the demand for each name. (The tally could be a demand function that plots the tally over time.)

d) The look-up program can output data associated with all the matched names, if the number of names is under a certain figure. For example, if only two McDonalds are listed, the system can output the phone numbers and addresses of both.

e) The system can output missing parts of the matched names and let the speaker choose one part. The name (and data corresponding to the name) can then be outputted. For example, if a speaker is looking for the phone number of Dr. William Condrell, the data-base might have two listings that are the same except for the address. Assuming the speaker does not know the exact address, as indicated by her entering "All Done," the system can then output one address or the other and have the speaker confirm it.

The system can also include a default whereby a speaker does not have to enter "All Done," for part of the name to be outputted for confirmation. When the list of names is narrowed down to a small number, the system can output part of each name and have the speaker choose the correct one. For example, in the case of Dr. Condrell, once two names are left, the system can output the address of one or both for confirmation. This default is can be useful when the names are identical except for one word or, in the case of a compound name, except for one name (such as an address). This default might be called a pseudo dump because the speaker may still have useful information to enter. It might also be called an interactive dump because it allows the speaker to confirm information about the name, leading to an exact match.

Note: No embodiment is included in this section because embodiments in other sections adequately illustrate the abbreviation method and system in combination with a look-up system.

Part 6: Interactive Guiding Functions

The Goal

When using the abbreviation method to find (uniquely match) a name in a data-base, a speaker has a search problem. Her goal is to take the least amount of time entering inputs to find the name. Ideally, each input should narrow the search as much as possible. While this ideal will rarely be met, a speaker using common sense can be very efficient.

For instance, say that the name the speaker seeks to match is "International Frozen Food Association" and that the data-base is the Washington, DC White Pages. Entering "I" as the first letter narrows down the possible names by about 98%, from about 100,000 to about 2,000. Entering "N" as the next letter only reduces the number by about [15%] 30% more. A better choice is "Second Word," "F" which narrows the possible matches by another 98%, to about 40. And though this name is but one example, it shows how quickly names can be narrowed down when a person uses common sense, which in this case dictates switching words rather than spelling out "International."

Despite the efficiency illustrated above, a speaker can get stuck entering inputs unnecessarily because she is ignorant of the other names in the data-base being searched. Before explaining this problem, a toy data-base will be introduced below that will illustrate points throughout this section.

| | |
|---|---|
| Bombay Club | Internal Medicine Group |
| Federal Election Committee | McDonalds, 5400 Georgia |
| Federal Express | McDonalds, 3400 Jennifer |
| Fetoosh Restaurant | McDonalds, 1200 K |
| International Management Association | Zei Club |
| International Management Group | Zei Club Vacations |

Getting Stuck

1. Stuck in Part of a Word

The speaker can get stuck spelling a part of a word that is fully specified by previous inputs. This happens when the part is common to other words in the data-base. For example, say a speaker is trying to match "Internal Medicine Group" above. Once he enters "I," he has narrowed his search to three names. Yet if he continues to spell "N-T-E-R-N-A" he will make no progress until he gets to "L." In other words, the "I" has specified "N-T-E-R-N-A" as well. It is better of course if the speaker switches words rather than spell this part.

2. Stuck in a Full Word

A speaker can get stuck spelling a word that has been fully specified by previous inputs. This happens when the word is common to other names in the data-base. For example, say a speaker wants to match the name "Zei Club." If he enters "Second word," "C," this letter narrows down the list of names to three, all of which include "Club" as the second word. Thus, any further inputs for "Club" are unnecessary.

3. Stuck in Multiple Words

A speaker can get stuck spelling more than one word that is fully specified by previous inputs. This can happen if the speaker does not know all the words in a name. The speaker thus may be stuck at a multiple match, where he cannot uniquely specify the name. For example, assume a speaker is trying to match a particular product, a Sony Walkman WFF24. The speaker might specify "Sony" and "Walkman," but if he does not know the last word, the model number, he is stuck spelling the first two words to no avail.

4. Stuck in One Name (or more) of a Compound Name

A speaker can get stuck spelling a name that has been fully specified. This can happen if he does not know all the names in a compound name. He may then be stuck at a multiple match. For example, say the speaker is seeking to match a McDonalds above. Once he enters "M," he has specified the first name. Spelling the rest of "McDonalds" is unnecessary. What is needed is part of the second name, the street address. Without any address information, the speaker is stuck at a multiple match of three McDonalds.

Interactive Look-Up System to the Rescue

Obviously, a speaker would like to be alerted when he is entering unnecessary inputs. He especially would like to know as quickly as possible if the best he can do is a multiple match. And, he would like helpful suggestions when he is stuck.

Fortunately, the look-up system can include functions that "look ahead" into the data-base and tell the speaker when he is stuck. These functions can also suggest inputs that will efficiently specify the name sought. These functions may be called guides.

There are two types of guides: probabalistic guides and definitive guides. As the name implies, probabalistic guides rely on probability and yield suggestions that are good guesses. By contrast, definitive guides do not rely on probability and yield suggestions that are certain.

A system can, and usually would, include both types of guides. In fact, definitive guides can be considered special cases of the probabalistic guides where the probability of events is 100%.

Definitive guides will be described first because they are simple and straightforward. By contrast, probabalistic guides, while basically simple, can entail numerous factors and subjective judgements (that go into constructing a probability function).

Two Assumptions Usually Built into Interactive Guides

Two assumptions are usually built into interactive guides. One is that the speaker will spell at least one letter in the word corresponding to the most recently entered word identifier. It may also be assumed that the speaker will continue spelling the word. The second assumption is that the speaker is abbreviating a name that is in the data-base. Of course, often the name [the speaker] is not in the data-base. However, usually, this fact will not change the advice the guide gives. The advice will not only lead the speaker to quickly specify a name that is in the data-base, but will also usually specify that a name is not in the database.

The subject of what inputs the speaker is likely to enter will be discussed further in the description of probabalistic guides.

Conditions that Trigger Interactive Guides

Before describing interactive guides, a quick discussion is in order about the conditions that trigger these functions to operate and output advice. In some cases, these functions may continually operate, checking the abbreviation against the data-base and then when certain conditions are met, outputting advice. In other cases, the triggers are simpler and do not involve the interactive guides checking the data-base. The conditions are, of course, set by the designer of a system and can be various. A system can include a combination of these. For example, an interactive guide can be triggered to output advice:

a. If a certain number of inputs has been entered for a word or name.

b. If the number of names matched is less than a certain number.

c. If the speaker has made less than a certain amount progress after having entered a certain number of inputs.

d. If the speaker enters a command, which might be called "Suggest," that denotes that the speaker desires the system to provide advice.

e. If the interactive guide finds that a certain input is expected to narrow down the list of matches by more than a certain amount.

f. If the interactive guide calculates the speaker's expected progress and the progress below a certain amount.

How a Guide Outputs Advice in a System with Voice Output

If a system uses voice output, a guide's advice will interrupt the speaker's entering of inputs (unless the speaker has specifically requested the advice and is waiting for it). Naturally, the speaker may be confused when he hears the advice. To mitigate this problem, a guide can output advice only when the value of the advice exceeds a threshold, meaning that the value of the advice outweighs the cost of interrupting the speaker, on average.

The speaker on his part should know that an input that has not been outputted back for confirmation is not stored in the abbreviation. Still, the speaker might get confused about what is in the abbreviation. And so, the system should include a reminder function, as previously described, that allows the speaker to find his place in a word or name.

How a Guide Processes Inputs

A guide can take a new, confirmed input and use it to search the data-base in order to determine if advice is needed. Or, to speed up this operation, the guide can process a new input before it is confirmed. In this case, the guide uses the recognizer's guess to search the data-base. The results of the search are provisional and outputted in the form of advice only if the input is then confirmed. The time it takes to confirm the input allows the guide more time to do its search. If the input is rejected, the results of the search are [cancelled] canceled.

For example, taking the toy data-base, say a speaker has already entered, "First Letter," "M." And assume that the recognizer has guessed this input correctly. The guide can process this information and arrive at the advice that the speaker should try spelling the second name, the address. When the speaker confirms the recognizer's guess with a "Yes," the advice is immediately outputted. If the confirmation is through the absence of a "No," assume that the speaker continues spelling "McDonalds" and enters "C."

Upon the entering of "C" the advice is outputted (and the "C" is not outputted back for confirmation).

If the guide does not use the recognizer's guess, but only confirmed inputs, the advice may take longer to be calculated. It is still outputted after the "Yes" or after the speaker's next input (in this case "C").

How a Guide Can Use an Unconfirmed Input to Alter Advice

After the sequence described just above, and before the guide's advice is outputted, the speaker may enter another input. This can often happen when confirmation is by a "Yes," and will usually happen when confirmation is by the absence of a "No." Before outputting it's advice, the guide can process this unconfirmed input. The information contained in the unconfirmed input is [probabalistic] probabilistic because it is a guess. Yet it can be valuable because with many inputs, especially word identifiers, the probability is high that the recognizer's guess is correct. Thus, for example, if the guide is about to output the advice that the speaker should change words, and the unconfirmed input is a word identifier, the advice is superfluous and wasteful. This example is but one obvious case. Unconfirmed inputs can be used to alter advice in many situations, for they are simply extra information a guide can take into account.

Speed of Computation in Guides

Because the speaker enters inputs quickly, the computational speed of the guides is important. However, the essence of the invention is not computational techniques which are well known in the field of data-retrieval. It will only be noted here that some common approaches can be used. For example, a guide can begin searching only when the search space of names has been narrowed down to a certain amount. A guide can sample the search space rather than examine it all. And, the search space itself can be specially formatted and indexed to make checking the information in each name or set of names faster.

Form of Advice Messages

Guides include a list of natural language messages that correspond to the entering and not entering of inputs. When the guide determines that an input or inputs should or should not be entered, the guide outputs the corresponding message. Advice messages can be in the form of questions. For example, "Try the third word," can be, "What is the third word?" It should be noted that messages, especially those in voice form, should be kept short. For example, "You can make no progress in the current word," might become "Try another word." An alternative can be messages that indicate, without being specific, how the speaker is doing. For example, "Hot" can mean very good progress, "Warm," can mean good progress, and "Cold," can mean little or no progress.

An especially useful form of message, in a system that includes and IVRR, is a message that is conveyed by a short tone. For example, a beep could mean that the speaker has fully specified a word or a name. Tones are very useful because they take little time to output and do not interrupt the speaker's flow of entering inputs. Various tones can be used to denote various messages. The most important of these is a tone that signifies that the speaker can make no more progress in a word.

Definitive Guides

There are two types of definitive guides: one that tells the speaker when she is stuck, the other that tells what inputs are best to enter.

Definitive Guides That Tell a Speaker When She Is Stuck

To stop a speaker from getting stuck in a name, a look-up system in combination with the abbreviation system can include a function that:

a. Examines the list of all the compound names in the data-base that match the abbreviation created thus far.

b. Compares all the names in that list corresponding to the last name identifier entered.

c. If all the names compared are identical, outputs a message telling the speaker that no more progress can be made in the name corresponding to that identifier.

For example, taking the [the] toy data-base, if a speaker enters "First Word," "M," the look-up system matches three compound names in the data-base. A default indicates that the first name identifier has been entered. Thus, the interactive look-up system compares all the first names in the compound names matched. All three compared are the same; all three are "McDonalds." Therefore, the interactive guide outputs a message saying that no more progress can be made spelling this name.

Figure 8:
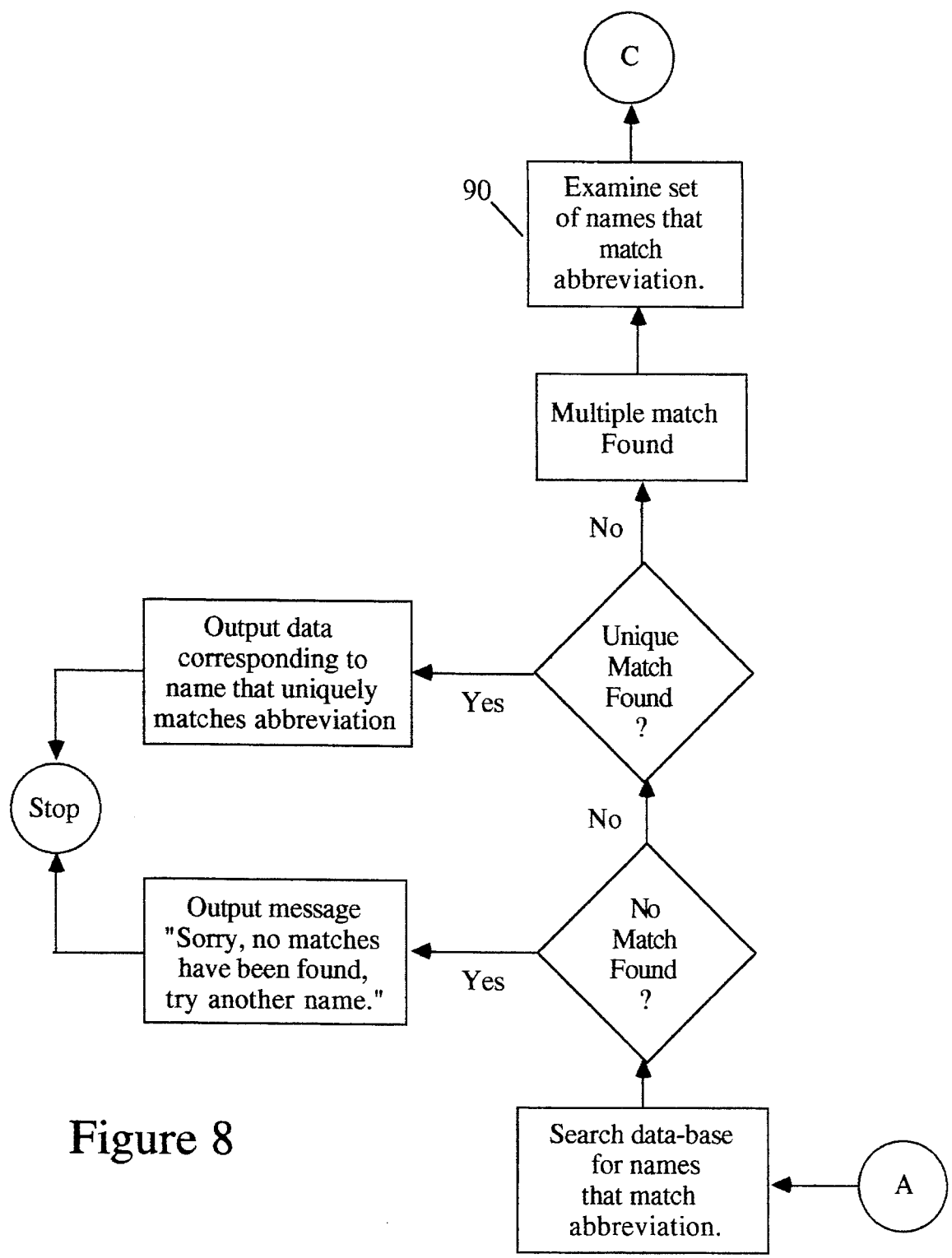
FIGS. 8–8f show flow charts of the system in combination with an interactive look-up system.
Figure 8A:
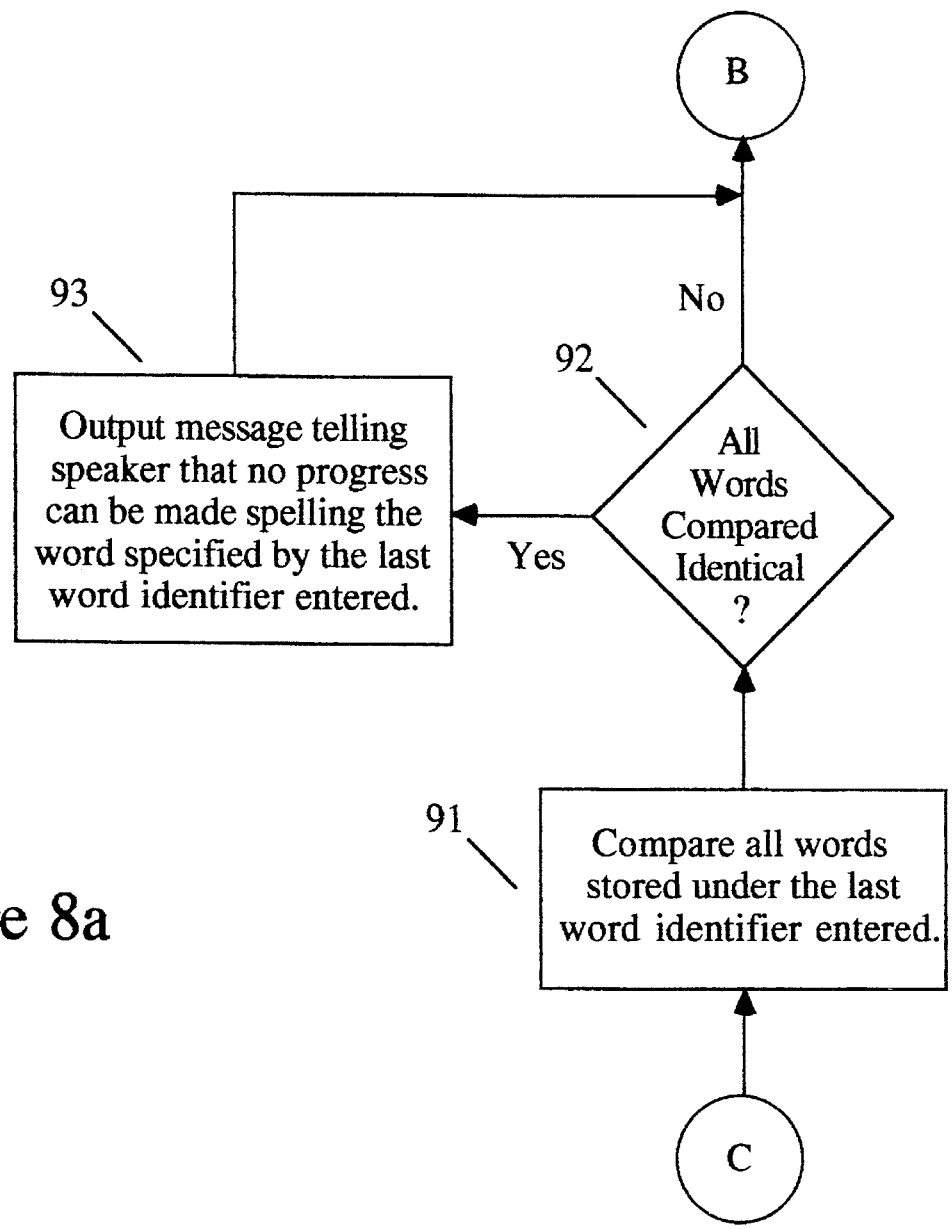

As shown in FIGS. 8 and 8a, to stop a speaker from getting stuck in a word, look-up system in combination with the abbreviation system can include a function that:

a. Examines 90 the list of all the names in the data-base that match the abbreviation created thus far.

b. Compares 91 all the words corresponding to the last word identifier entered.

c. If all the words compared are identical 92, outputs a message 93 telling the speaker that no more progress can be made in the word corresponding to that identifier.

For example, taking the toy data-base, if a speaker enters "First Word," "Z," the look-up system matches two names: "Zei Club" and "Zei Club Vacations." The interactive guide compares the first words in the two names. The words are identical. Hence the guide outputs a message that no more progress can be made spelling the first word in the name.

To stop the speaker from getting stuck in a word part, the function can also include the following steps:

d. If all the words compared are not identical,

1. Compare the letters in all the words compared starting from the letter after the last letter entered.

2. Find the number of consecutive letters, N, that are identical in every word compared, 3. If N>M (a threshold value), output a message telling the speaker that no progress can be made in the word for N letters.

For example, taking the toy data-base, if a speaker enters "First Word," "I," the look-up system finds: "International Management Association," "International Management Group" and, "Internal Medicine Group." The interactive guide then compares the first words and finds that the next six letters, N-T-E-R-N-A, are identical. Assuming six letters exceeds the guide's threshold, the guide outputs a message telling the speaker that no progress can be made for six letters.

Remarks About Suggested Inputs

Before describing definitive guides that suggest specific inputs, some remarks are necessary about suggested inputs. These remarks apply to both definitive and [probabalistic] probabilistic guides.

Suggested Inputs Defined

Suggested inputs are inputs and sequences of inputs that a guide tests for possible outputting as advice. The term "suggested input" may be a bit confusing because it can refer to both a single input and a sequence of inputs. The reason that both are referred to as a suggested input is that [in plain English, the form the advice takes,] a sequence of inputs and a single input are often phrased the same way. For example, a guide might output a message, "Enter the number of words in the name." To enter this information the speaker may need only a single input. Another message might be, "Spell the second word." To enter this information the speaker needs a sequence of two inputs. A suggested input can involve multiple letters because a guide can test the value of spelling two or more letters in a row. Thus, when a guide compares the information value of one suggested input to another, a single input may be compared to single input or to a sequence of inputs.

There is no formula for deciding what inputs should be tested. The set of suggested inputs is determined by the designer of a guide. The set is usually limited by the desire to suggest user friendly inputs. It should be noted that when a compound name is being abbreviated, the guide can test and suggest inputs that apply any name in a compound name.

What Suggested Inputs Are Outputted

Suggested inputs may also ranked according to user friendliness. For example, spelling the first letter of a word might be informationally equivalent to spelling the last letter of the word. However, the first letter is the more user friendly choice. Thus, a guide can include a ranking so that, given two informationally equivalent inputs, the guide outputs the more user friendly choice. The ranking might even direct the guide to suggest an input that has less information value but is more user friendly than the mathematically best choice. A guide can test the whole set of suggested inputs or, once an adequate input is found, the testing can be stopped.

"Ranking suggested inputs by user friendliness" is not anything exact. It is a design decision that can be as complex or as simple as the designer wants to make it. The set of suggested inputs may be quite limited with each input considered equal in user friendliness. Then if two or more inputs have equal information value in a given situation, one can be picked randomly or more than one can outputted. On the other hand, the conditions whereby one input is preferred over another can be complex where two factors, information value and user friendliness are taken into consideration.

How Many Suggestions to Output

Another question is, how many suggestions are to be outputted? For example, what if more than one input creates a unique match when applied to all names? In the basic outline below, the first input that creates a unique match in all cases is the input suggested. However, a guide can be designed to output more than one suggestion.

If a Speaker Doesn't Know Enough to Enter the Suggested Input

One reason to output multiple suggestions is that the speaker may not know enough to take the guide's advice. This possibility is simply another factor a designer of a system must take into account when deciding what inputs to include in the set of inputs to be tested. The set of testable inputs can vary according to how much knowledge the speaker has demonstrated. For example, the guide can include a rule whereby the only inputs suggested are those that apply to words or names that the speaker has already entered to some extent.

Calculating the Value of a Suggested Input

In order to suggest inputs, both definitive and probabalistic guides must calculate the information value of different inputs in a set of suggested inputs and (usually) output a message that suggests the input with the highest value. Before describing how the guides work then, a brief discussion is in order about calculating the value of an input.

Definitive guides use a non-probabalistic formula. Probabalistic guides use this same formula as a base and add probability factors to it.

Before describing these formulas and their implementation in guides, it should be noted that they are not meant to be the only possible formulas or even the best formulas in all situations. They simply illustrate the type of formula that an [an] interactive guide requires in order to suggest inputs; namely a formula (function) that calculates the value of selected inputs that the guide can suggest.

Calculating the Information Value of an Input

Information theory provides [elementary] formulas for measuring the value of a piece of information (an input). While a variety of these can be used in an interactive guide, all share the same idea. The idea is that the value of an input is measured by how many names it knocks out of a list of matches; by how much it narrows down the list of matches.

A formula, call it INFO-VALUE(Input, Name), calculates the value of an input applied to a name. That's because the value of an input depends on what name the speaker is spelling. "Applying an input to a name" means that the function assumes that the speaker is spelling a certain name. The function then finds the letter or numeric value that corresponds to that input in that name. This letter or numeric value might be called the Resulting Input.

Two examples: If the name is "Zei Club" and the function applies "Second Word," "Last Letter," then the Resulting Input is "B." If the speaker has already entered, say, "First Word," "Z," and the function applies Next Letter, then the Resulting Input is "E;" because, as mentioned, the program defaults to assuming that the speaker will continue spelling the word he last entered a letter for. In this case the word is "Zei."

INFO-VALUE(Input, Name)

INFO-VALUE(Input, Name) executes the following steps:

1. Selects a name from the set of names matched by the abbreviation.
2. Selects an input from a set of suggested inputs.
3. Applies the input to the name, yielding a Resulting Input.
4. Stores the Resulting Input in the abbreviation thereby creating a hypothetical abbreviation.
5. Finds the set of names that match the hypothetical abbreviation.
6. Subtracts these hypothetical matches from the original set of matches (which yields the number of matches the input would eliminate if the speaker was spelling the selected name).
7. Divides the number of matches eliminated by the original set of matches minus one. [Matches eliminated/(Original matches −1)].

The ratio in step 7 measures of the value of the input selected applied to the name selected. For example, taking the toy data-base, say a speaker enters "First Word," "F-E." These inputs result in three matches: "Federal Election Committee," "Federal Express," and "Fetoosh Restaurant." If INFO-VALUE applies Next Letter to the name, "Fetoosh Restaurant," the Resulting Input is "T," which eliminates two matches and leaves just one, "Fetoosh Restaurant." Thus, INFO-VALUE of Next Letter applied to "Fetoosh" is (2/(3-1)) or 1.0.

1.0 signifies that the input, in the case above "T," has eliminated 100% of the "false" matches leaving the one "true" match, the name the speaker seeks to uniquely match.

A Definitive Guide Applies INFO-VALUE to All Matched Names

A definitive guide applies INFO-VALUE to all names that are matched by the abbreviation because each of these names is potentially the one the speaker is abbreviating. Since the system does not know which name the speaker has in mind, the system must check each name.

For example, taking the toy data-base, say a speaker enters "First Word," "F-E." These inputs result in three matches: "Federal Election Committee," "Federal Express," and "Fetoosh Restaurant." Now, INFO-VALUE can check a variety of inputs. The first input checked though is normally Next Letter, the input that corresponds to the next letter in the word currently being spelled.

INFO-VALUE applies this input to all three matches. As mentioned above, INFO-VALUE of Next Letter applied to "Fetoosh" is (2/(3-1)) or 1.0. However, INFO-VALUE of Next Letter is different when applied to "Federal Election Committee." With this name the next letter is "D." When put in the abbreviation, this letter yields two matches, "Federal Election Committee" and "Federal Express." In other words, it eliminates one match, "Fetoosh Restaurant." The INFO-VALUE then of Next Letter applied to "Federal Election Committee" is (1/(3-1)) or 0.5. The same is true for the name "Federal Express," which is in the same set of two hypothetical matches as "Federal Election Committee." This set has but two matches of course.

(Note: A given input applied to any name in a set of hypothetical matches will create the same set of hypothetical matches. Thus, only one name in a set of hypothetical matches needs to have an input applied to it, as long as the guide keeps track of the names in each set of hypothetical matches. This principle is shown just above where two names have the word "Federal" as the first word. This principle is simply noted here to point out that there may be more efficient ways to calculate the value of an input than are described here. Methods for making the calculation most efficiently Will not be discussed in detail though since the point is not the efficiency of the calculation but the calculation itself.)

A Definitive Guide That Suggests Specific Inputs

Figure 8B:
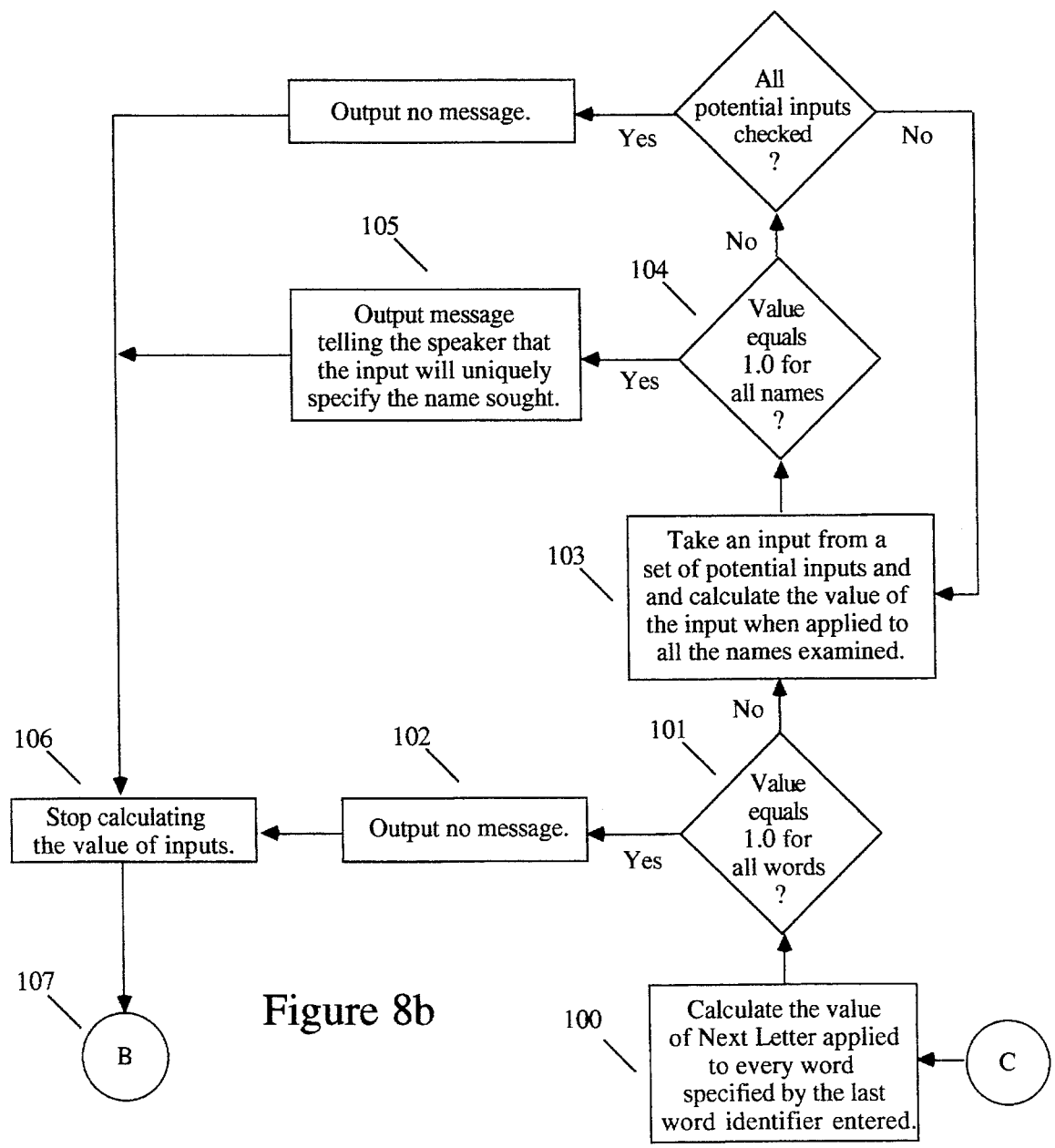

As FIGS. 8a and 8b show, a look-up system in combination with the abbreviation system can include a function that:

a. Examines 90 the set of all the names in the data-base that match the abbreviation created thus far.

b. For each name, calculates 100 the value of the next letter being entered in the word corresponding to the last word identifier entered. (In other words, the function first checks all the names to find the value in each case of the next letter in the word currently being spelled.)

c. If INFO-VALUE(Next Letter) is 1.0 for all names 101,
  1. Outputs no message 102.
  2. Stops measuring the value of inputs 106.

d. If not 101,
  1. Takes a set of potential inputs 103.
  2. Calculates 103 the information value of each input applied to all the matched names.
  3. If INFO-VALUE of any input is 1.0 for all names 104,
    3a. Outputs a message 105 telling the speaker that that input will uniquely specify the name.
    3b. Stops measuring the value of inputs 106.

e. Returns 107 to the IVRR.

For example, taking the toy data-base, the inputs "First

Word," "F-E," result in three matches: "Federal Election Committee," "Federal Express," and "Fetoosh Restaurant." INFO-VALUE then checks the next letter and, as mentioned above, finds that next letter yields a value of 1.0 only when applied to "Fetoosh Restaurant." Thus INFO-VALUE checks a variety of alternative inputs. Several user friendly inputs will not yield values of 1.0. For example, if the speaker spells the second word, the speaker will not specify the name in one letter because two names have the same first letter, "E," for the second word. Likewise, an input for the third word will not work because two names do not have a third word. After checking various user friendly inputs, we assume INFO-VALUE checks "Last Letter" for each of the words. It finds that "Second Word," "Last Letter" yields a value of 1.0 for all three names. Thus, the guide outputs the following message, "The last letter of the second word will specify your name uniquely."

Suggesting Inputs that Do Not Uniquely Specify a Name

The definitive guide described above suggests to the speaker an input that uniquely specifies a name in all cases. It may be though that no input will do this. And yet it may also be that certain inputs will have much higher values in all cases than the next letter of the word currently being spelled. In this case, a definitive guide can check the value of alternative inputs and suggest the one with the highest value. For convenience, this type of definitive guide will be subsumed under the category of probabalistic guides that suggest specific inputs.

Probabalistic Guides

The basic idea behind probabalistic guides is simple. Whereas definitive guides give the speaker advice that is certain, probabalistic guides give advice that is probable (e.g., "You are probably stuck, or "You should probably spell the second word."). When a definitive guide tells a speaker he is stuck, the speaker is stuck given every name that matches the abbreviation. Likewise, when a definitive guide suggests an input, the input has a minimum value for every name.

The problem with this approach is that the value of an input may vary widely, being high when applied to certain names and low when applied to others. A conclusion about every name is often not possible. And so, what a probabalistic guide does is sum the value of an input over all the names the speaker might be abbreviating. The input with the highest total is the one that has the highest value, on average (an average can be taken yielding the expected value of the input.)

A second toy data-base is introduced here to illustrate points about probabalistic guides.

Sony W2FF

Sony W2FG

Sony W2FH

Sony Z9LH

For example, taking this toy data-base, the input "First Letter," "Second Word," applied to the first three names has an INFOVALUE of ⅓ (it knocks out only one name, the fourth name). When the same input is applied to the fourth name though, the INFO-VALUE is 1 (it knocks out the other three names). The total then is 2. If we take another input, say the last letter of the second word, we find that the total INFOVALUE for the first two names is 1 and for the second two 0.5, a total of 3.

Weighted Sum

The problem with a simple sum, like the one above, where each name has an equal weight is that in most real world situations each name will not have an equal weight (weight means the probability of being abbreviated). What is needed is a weighted sum.

For example, taking the toy data-base, assume the Sony model Z9LH is a bestseller and that the other three models are dogs. Assume that the chance of model Z being looked-up is 0.7 and the chance of the other three is 0.1 for each. Now let us apply the same inputs we applied above. We find the total INFO-VALUE of the first letter of the second word is:

(0.1×⅓)+(0.1×⅓)+(0.1×⅓)+(0.7×1)=0.8.

We find the total INFO-VALUE for the last letter of the second word is:

(0.1×1)+(0.1×1)+(0.1×0.5)+(0.7×0.5)=0.6.

How the weights are determined depends on the application of course. It is worth noting though that in many situations, the weights should come from the actual usage of the data-base itself. A guide can therefore include a simple demand function that measures demand by tallying the times a name is abbreviated. Or the guide can include a demand function that varies with time. Such a function can be much more useful than a simple tally.

For instance, we can assume that the Sony Model Z, which was so popular in our last example, will become unpopular and thus infrequently abbreviated. A demand function that varies over time can reflect this reality quickly. A simple example of such a function is one that tallies the number of times a name is abbreviated during set time periods. Demand as tallied in the most recent time period is then the demand factor used to determine the probability of a name being abbreviated.

Two Types of Probabalistic Guides

Like definitive guides, probabalistic guides can be divided into two types, those that tell the speaker when she is probably stuck and those that suggest specific inputs. Probabalistic guides that tell the speaker when she is probably stuck will be described first. The two types of guides would usually be combined in a system.

Determining Whether or Not the Speaker Is Probably Stuck

Three basic procedures for defining whether a speaker is stuck in a name, word, or word part are:

1. The Percentage of Names with Identical Parts Is Above a Threshold

When examining the compound names that match the abbreviation, a function can find the percentage that have identical names in the position specified by the last name identifier entered. When examining singular names that match the abbreviation, a function can find the percentage that have identical words in the position specified by the last word identifier entered. Likewise, a function can find the percentage of names that have identical word parts in the words specified by the last word identifier entered. In each case, when the percentage is above a threshold, the guide can declare that the speaker is probably stuck in the relevant part (name, word, or word part).

2. The Expected Value of Next N Letters Is Below a Threshold

A function can calculate the expected value of spelling the next N letters of a name, word, or word part. If the expected value of the sequence of letters is below a threshold, the guide declares that the speaker is probably stuck in the relevant part (see example below).

3. The Expected Value of the Speaker's Inputs Is Below a Threshold

A function can calculate not only the expected value of a sequence of letters but also the probability of a speaker entering any given sequence of inputs. This probability can be factored into an expected value function to yield the expected value of the speaker's input. If this expected value is below a threshold, the guide declares that the speaker is probably stuck. Rather than calculate all these probabilities, a guide can use historical data to supply the expected value of a speaker's input at a given stage of entering inputs. The point is that this expected value can be determined in various ways. In fact, a short cut, described just above, is to assume that the speaker will continue spelling a word. The function then measures the expected value of the next N letters of that word, as explained above. This short-cut can be useful but is not necessarily the best method. Ultimately, choosing a measuring procedure for the expected value of the speaker's next inputs is a design decision with no perfect solution in most cases.

Many Definitions of Being Probably Stuck

As the procedures above demonstrate, there are many ways of mathematically defining that a speaker is probably stuck. All include some kind of formula for calculating the expected value of the speaker's next inputs. The formula may be crude, as when it take the ratio of names with identical words. It may include assumptions, such as [the] that the speaker will very probably spell the word he last entered an identifier for. It may be more exact, as when probability estimates for the speaker's expected inputs are factored in. The point is not the exact definition procedure used in a guide—for the proper probability functions are usually debatable—but that a reasonable probabalistic procedure is used at all. An example is given below.

Figure 8C:
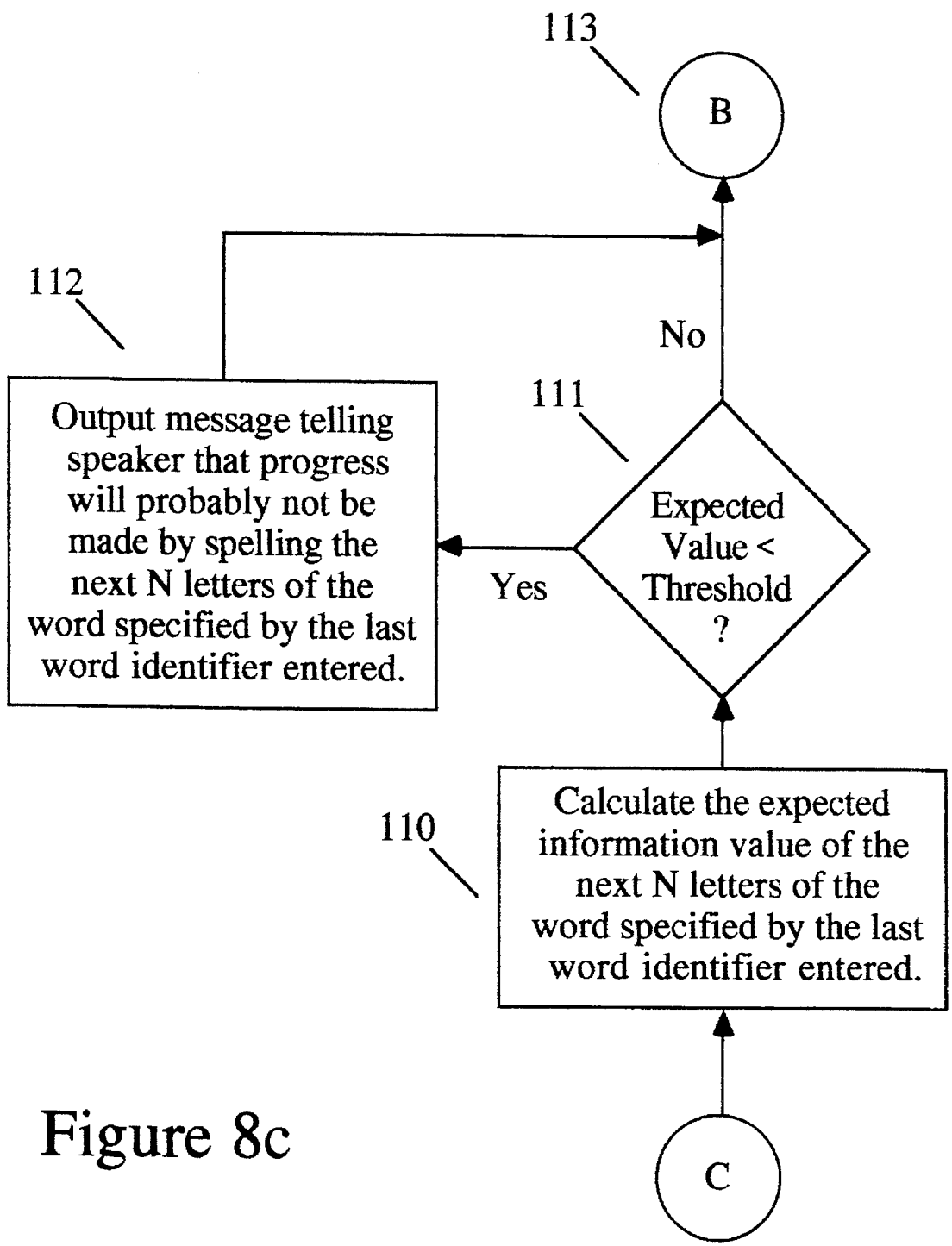

As FIGS. 8 and 8c show, to stop a speaker from getting stuck in a word part, a look-up system in combination with the abbreviation system can include a function that:

a. Examines 90 the set of names that match the abbreviation created thus far.

b. Calculates 110 the expected information value of the next N letters in all the words specified by the last word identifier entered.

c. If the expected value is below a certain threshold 111, outputs a message 112 telling the speaker that she will probably make little progress for the next N letters.

d. If the expected value is equal to or greater than the threshold, outputs no message 113.

The number of letters, N, that are examined is a design decision. The procedure above can be used to define whether a speaker is stuck in a full word or in a name as well. For instance, one way to define whether a speaker is stuck in a full word is to set N at the number of letters in the longest word being checked. And, one way to define whether the speaker is stuck in a name is to apply the next N letters to all the words in the name and find whether the expected value is below a threshold for all the words in the name.

Threshold Definitions of Being Stuck

The procedures above for defining whether a speaker is stuck include threshold values. If the speaker's expected progress is below a threshold, the guide declares that the speaker is probably stuck. A threshold can be a constant. Or, it can vary [with the number] depending on a variety of factors Such as how many inputs have been entered. OR, it can depend on the expected value of other input sequences.

Checking the value of other sequences can be useful for it is often counterproductive to tell the speaker he is probably stuck in, say, a word if he is only going to try another word where he is equally stuck. Hence, a guide can include steps for checking the "level of stuckness" in each word in a name. If the expected value of the speaker's next input(s) is below a threshold when all the words are taken into account, she is "stuck all over." Rather than tell the speaker she is stuck in this case, the guide for suggesting specific inputs would be invoked.

Of course, this suggesting guide can be invoked when various conditions are met. The point is simply that guides that tell a speaker he is stuck are best combined with guides that suggest inputs. A guides that tells a speaker he is stuck leads the speaker to try other words or names as dictated by common sense. After common sense narrows the search and a trigger condition is met, the guide that suggest inputs is invoked, leading the speaker to the "finish line."

Subtleties of Probabalistic Guides that Suggest Inputs

In order to suggest inputs, a probabalistic guide must evaluate a set of alternative input sequences and select the one that has the highest expected value. (A sequence may be a single input long.) This selection process is not necessarily so simple because, as mentioned previously, another factor in selecting inputs is user friendliness. User friendliness is a subjective notion that defies objective mathematical definition. For this reason, it will not be discussed in detail, except to point out again that a function that outputs suggested inputs must include some way of ordering those inputs in addition to highest expected information value.

Even when the measure of the best suggested input is simply highest expected value, as it may often be, two inputs that have the same value need to be ordered for the purpose of outputting. While the ordering can be randomized, in most applications randomization is not optimal because certain inputs are more user friendly than others. This fact should be incorporated into a function that suggests inputs. To give but one example, each input can be assigned a user friendliness factor that is multiplied by the input's expected value to yield a "composite value." Since the methods of taking user friendliness into account are so various and subjective, they will not be described further or included in the figures or embodiment.

The Infinite Variety of Probabalistic Guides

Probabalistic guides rely, of course, on probability functions. The best probability function to apply in a given situation is often a subjective matter. A quick analogy to baseball makes the point. In baseball, a batting average (Hits/At Bats) is the core formula for measuring a player's ability to get a hit. Will this formula really give a player's chance of getting a hit though? What if the hitter is facing Nolan Ryan? What if the hitter has a tender hamstring? What if the hitter just broke up with his girlfriend? What if the bases are loaded? All such factors could be incorporated into a probability function. At least though, it would still contain a core of (Hits/At Bats).

Likewise, a guide can include many factors such as patterns of inputting, the chance that a person is abbreviating a name not in the data-base, the chance that a speaker is an experienced user of the system, the relative frequency of letters and words, etc. One cannot possibly describe all the variations. At least though, all will contain a core that measures the number of names a suggested input will eliminate if a given name is being abbreviated.

The basic goal of a guide is to help the speaker find the quickest and easiest path to successfully abbreviating a name. This problem cannot be solved perfectly for most real world data-bases. In fact, the key merit of the abbreviation method and system is that it lets the speaker use his common sense and knowledge to pick inputs to enter. Common sense can even override the advice of guides, as when the speaker knows he is abbreviating an unusual word. The speaker uses rules of thumb. (Some such rules can be incorporated into guides and outputted as advice.)

Figure 8D:
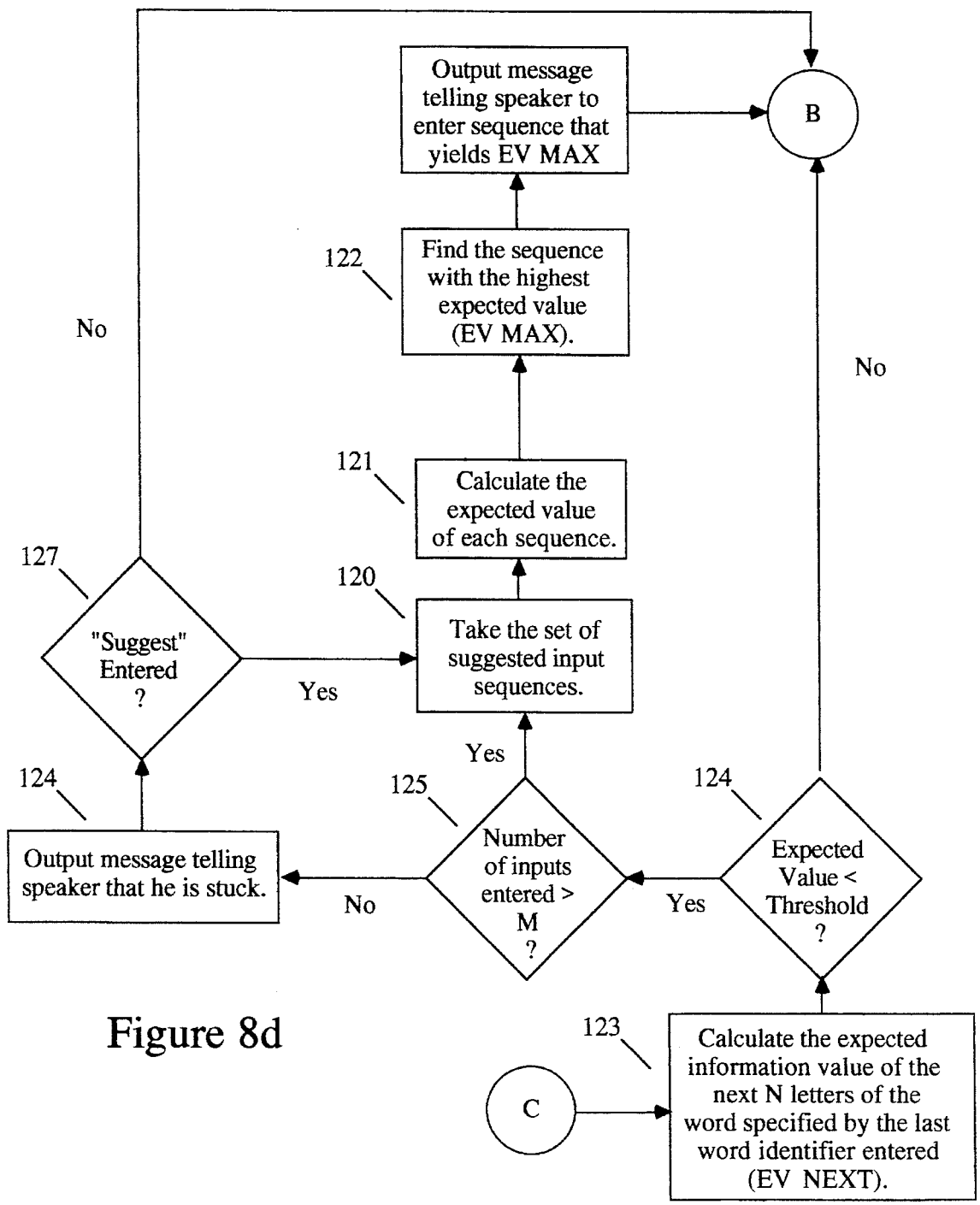

However, when rules of thumb and knowledge fail, a guide must include a function that outputs advice (asks for the speaker for information) based on what information will narrow the search in an efficient manner. Such functions are well known in the field of data retrieval. As discussed, they require a formula or formulas for calculating and comparing the expected information values of inputs (sequences of inputs). And so, as shown in FIG. 8d, a probabalistic guide that suggest inputs must:

a. Examine 120 a set of suggested inputs.

b. Calculate 121 the expected information value of each.

c. Select 122 the suggested input with the highest value.

Triggers Revisited

As mentioned previously, a guide must be triggered by some condition or conditions to find the best suggested input, and be triggered by some condition or conditions to output the suggestion. The trigger for invoking the guide to search for suggestions may be the same one that causes the guide to output a suggestion. In some cases, a guide might search from the beginning for optimal inputs. As mentioned, the triggers used can vary widely. Five useful triggers are described below.

1. "Suggest."

Perhaps the simplest trigger, and in many cases the most useful, is a request by the speaker for advice. When the speaker enters an input, call it "Suggest," the guide then searches for the best input. The reason this input is so useful is that advice is given at the speaker's discretion rather than automatically given. Advice that is automatically triggered can confuse and irritate the speaker who may know what he is doing, or at least think he knows what he is doing.

2. Number of Inputs Greater Than a Threshold

Another trigger is to allow a speaker to enter a certain number of inputs. After this number has been entered, if the name is not uniquely matched, the guide searches for and outputs the best suggestion.

3. Comparing the Value of Spelling with the Value of the Best Input

Another useful trigger is an automatic one whereby the guide calculates the expected value of the next N letters of the current word being spelled. The expected value of the best suggested input is also found. If the difference is greater than a threshold amount, the guide suggests to the speaker that he enter the best suggested input.

4. Comparing the Speaker's Expected Input Value with the Best Input's

In the trigger just above, the value of the best suggested input is compared to the value of spelling the next N letters of the current word. As discussed, in some cases it may be better to compare the value of the best suggested input to the expected value of the speaker's next inputs taking into account not just the current word being spelled but the probability of all possible inputs being entered. If the difference in values is greater than a certain threshold, the guide outputs the best suggested input.

5. Speaker Says He Doesn't Know the Suggested Input

In certain applications, if the speaker does not know the input that is suggested, the system can include an input, call it "Don't Know," that signifies that the speaker does not know the suggested input. When the speaker enters "Don't Know," the guide is triggered to output the next best suggestion.

Embodiment

To illustrate the preceding points about probabalistic guides that suggest inputs, we use again the first toy data-base introduced. For simplicity's sake, we assume that each name has the same chance of being abbreviated.

| | |
|---|---|
| Bombay Club | Internal Medicine Group |
| Federal Election Committee | McDonalds, 5400 Georgia |
| Federal Express | McDonalds, 3400 Jennifer |
| Fetoosh Restaurant | McDonalds, 1200 K |
| International Management Association | Zei Club |
| | Zei Club Vacations |
| International Management Group | |

We assume that our heroine, the speaker, is trying to abbreviate "Internal Medicine Group." She enters "First Word," "I." These inputs narrow down the search to three names. As shown in FIG. 8d, the guide calculates 123 the expected value of the next three letters in all the first words remaining and finds that for all three names the expected value of entering those letters ("N-T-E") is 0. The guide therefore compares 124 that value to an expected value threshold, which at this stage is set at, say, 0.5. Since 0 is less than this amount, the guide then compares 125 the number of inputs already entered, which is two, and finds that that number is below an input threshold of, say, five. Thus, the guide outputs a message 126 telling the speaker she is stuck.

Our hero feels lazy and enters "Suggest" 127. The guide then takes 120 a set of suggested inputs which consists, in this imaginary case, of the next two letters of the remaining words. The guide calculates 121 the expected value of each sequence and finds 122 that spelling the second and third words yields the same value. The guide then checks its table ranking the input sequences by user friendliness and finds that spelling the second word is slightly more user friendly than spelling the third. Hence, the guide outputs, "Spell the the second word."

Now, let's pretend that our heroine was not so lazy. (We also assume here that the threshold for triggering the guide is a comparison between the best suggested input and the spelling of the next N letters of the current word. In the example just above, the thresholds were an expected value constant (0.5) and the number of inputs entered.) Our heroine has decided to keep trying on her own rather than ask for help. Because she knows she's probably stuck in the first word, she tries the third word. She enters "Third word."

Figure 8E:
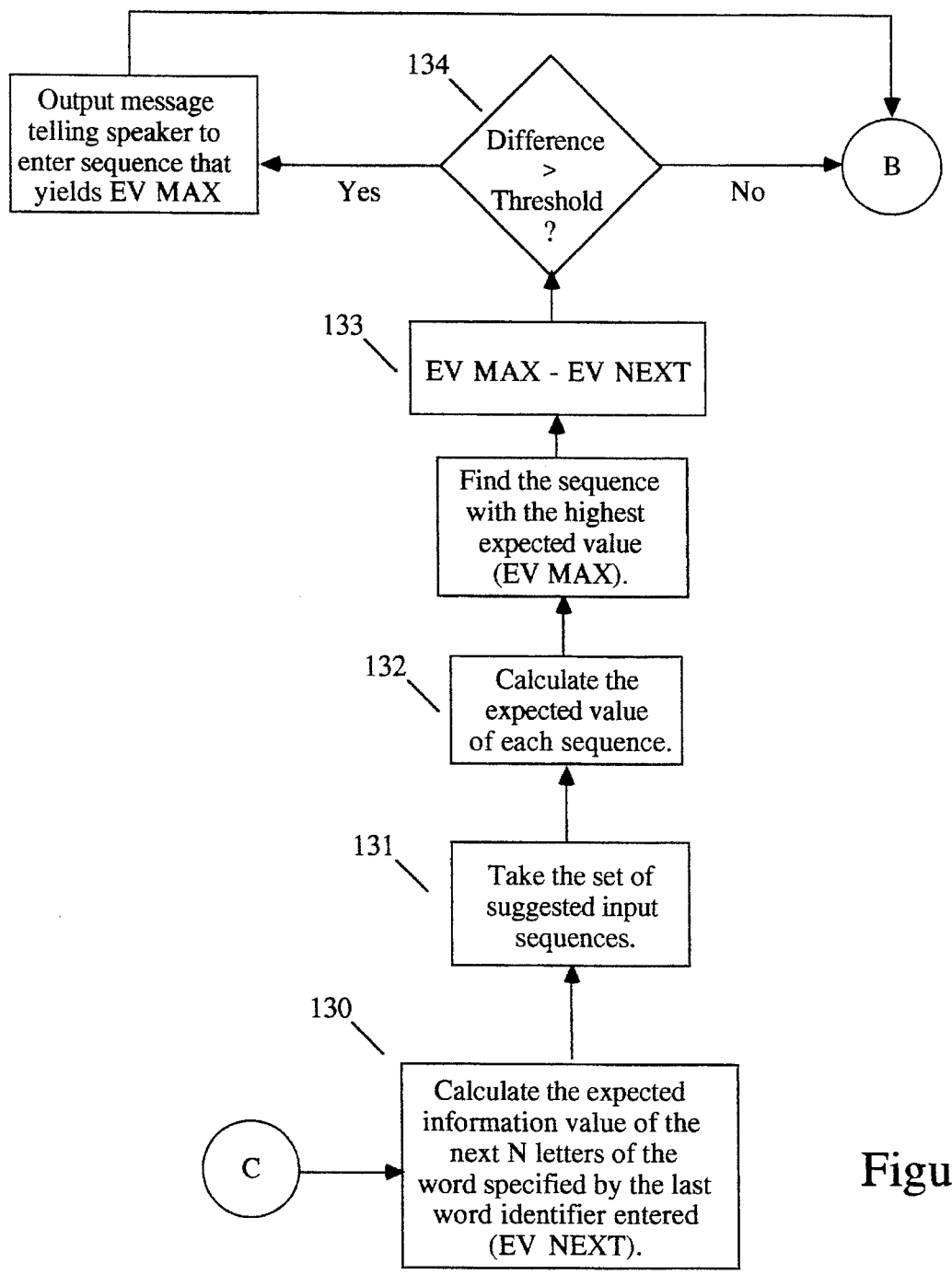

As shown in FIG. 8e, the guide calculates 130 the expected value of spelling the next [three] two letters of this word and finds that the expected value is ⅔. The guide also calculates 131, 132 the value of the set of suggested inputs, which consists now of spelling the second word. The guide finds that the value of spelling the second word is ⅔ as well. The difference 133 between the two values is taken. The result, 0, does not trip the threshold 134 and so the guide outputs no message, letting the speaker feel free to continue.

After the she enters one letter, "G," the guide finds that the she is stuck again, for only two names are left, both with the last word "Group." The guide then checks the set of suggested inputs and finds that spelling the second word will yield an expected value of 1.0 within two letters. The difference is taken between continuing with the third word and spelling the second word. This time the difference, [1] 1.0, does trip the threshold. The guide thus outputs a message telling the speaker to spell the second word.

Figure 8F:
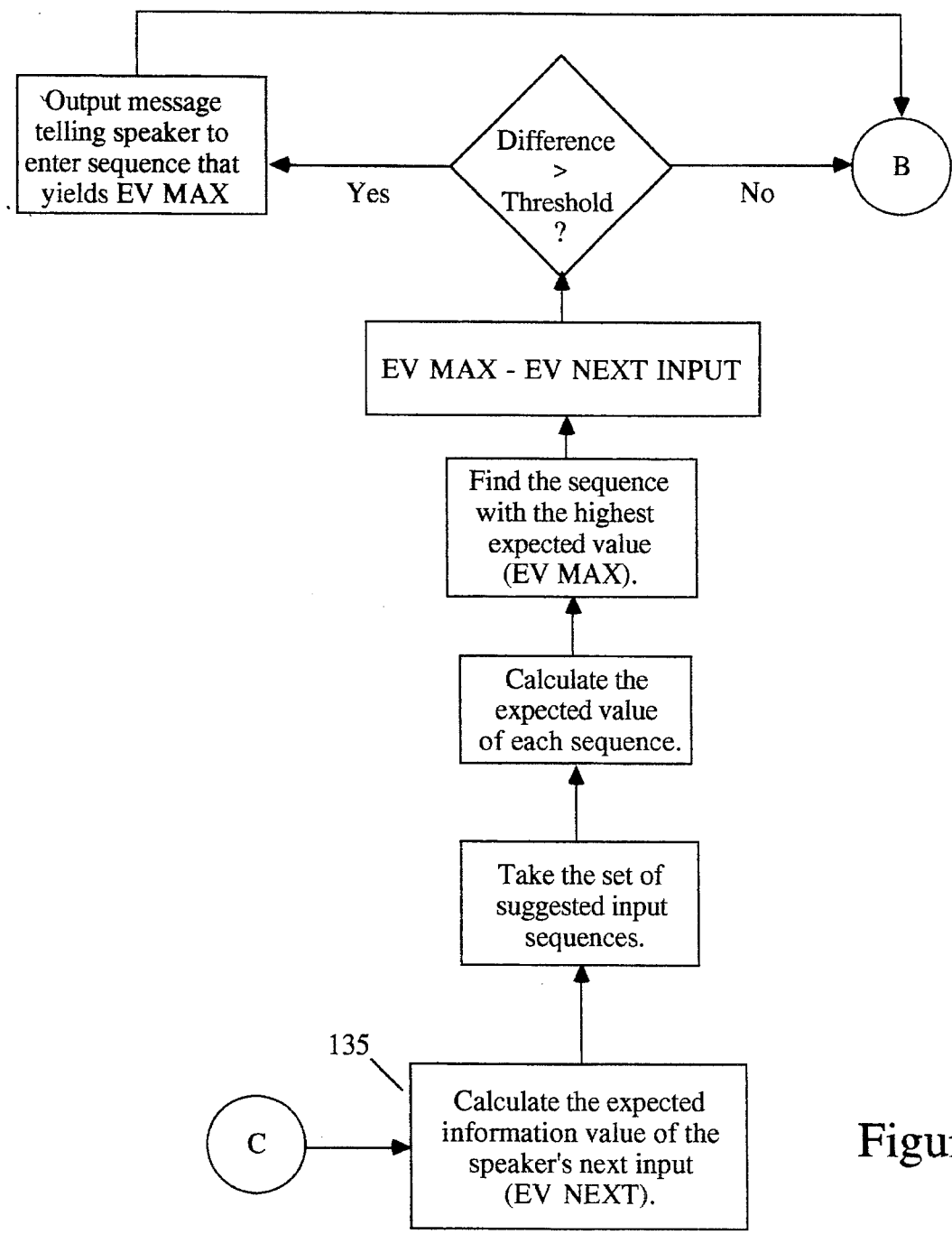

In the example above, the trigger threshold was a comparison involving the value of spelling the next N letters of the current word. Instead of using this value in the comparison, the guide can calculate the expected value of the speaker's expected input. In other words, as mentioned previously, the probability of the speaker [spelling] entering each possible input can be taken into account. However, as also mentioned, a function incorporating the probability of the speaker entering any given input can be constructed in a wide variety of ways. Most will be more complicated than assuming the speaker will continue spelling the current word. Nevertheless, it may often be a best to factor in the chance that speaker will not continue spelling the current word. For example, most speakers might change words after entering two letters of a given word. Therefore, it would be best to factor that behavior into an expected value function for the speaker's next input(s). And so, the possibility is noted, as shown in FIG. 8f, where the step 135 of calculating the expected value of the speaker's input is given.

Part 7: Abbreviation System Including A Function that Creates Multiple Abbreviations Prefatory Note This section describes an additional function that can be incorporated into the abbreviation system described in the preceding sections. This function has a section all to itself because it does not appear to use the abbreviation method also described.

However, it should be pointed out that the method is used as a first resort. If it fails, the function then creates multiple abbreviations not directly based on the method. Still, even with these, there is a direct link to the original method, as will be seen.

Function that Juggles Word Order

When using the abbreviation method, a speaker might know a word or words in a name but may not be sure where the word or words go. For example, say a speaker wants to abbreviate "Herman's World of Sports," but the speaker only knows that "Herman's" and "Sports" are in the name. The speaker would then only want to abbreviate these two words.

Hence, the system can include a function that "juggles" the word order entered by the speaker, thereby creating multiple abbreviations. The speaker can then invoke this function when necessary. If the speaker is unsure of the word order in a name, she can enter an input, call it "Juggle," that causes the function to use the speaker's inputs to create an abbreviation for every possible combination of word orders.

For example, say a speaker was abbreviating "Walker Williams." And say the speaker did not know whether the name was listed in the data-base as "Williams, Walker" or "Walker Williams." The speaker could then enter, "First word, "W-A." Second word, "W-I," "Juggle." The function would then create a set of abbreviations using "W-A." and "W-I" as the beginnings of two words. These two word pieces would then be placed in every possible combination of positions in a name.

Of course, the number of words in the name has to be established. Either the speaker will have entered the number of words or the function has a pre-set limit. (The limit might be set at a certain number of combinations rather than a certain number of words.)

Thus, the function does not only create an abbreviations with two words but with every number of words up to the limit set in the function or up to the number set by the speaker. For example, if the limit was four words and the speaker did not enter the number of words in the name, "W-A" and "W-I" would be placed in every combination of positions that exists in two-word names, three-word names and four-word names. The two word combinations are, of course, the simplest: "W-I," "W-A" and "W-A," "W-I." With more than two words, the set of combinations begins to explode.

This set of combinations (multiple abbreviations) is used to search a data-base. The combinations not matching any names are eliminated.

Default

Before creating all these combinations, the system program first tries the words in the order specified by the speaker. This default is important because, when the speaker is right about the word order, no unnecessary abbreviations (and thus matches) result.

(For efficient searching, the juggle function might require that a certain number of inputs be entered before it will create multiple abbreviations. The more :inputs, the quicker abbreviations can be eliminated as possible matches for names in a data-base.)

Fixing the Position of a Word

Because combinations explode leading to false matches, it is more efficient to juggle when one or more words is in a fixed position. Thus the juggle function can include a feature that allows a speaker to fix the position of a word. In all combinations the word would then have the position specified. The system program would include an input, call it "Sure," signifying that the speaker is certain of the position of a word. In other words, the input signifies that the inputs stored under the last word identifier entered are not to be juggled. For example, a speaker abbreviating "Herman's World of Sports" might be sure that "Herman's" is the first word in the name. Thus he enters "First Word," "Sure," "H . . . ". The input of "Sure" directs the juggle function to restrict all combinations of the abbreviation to having "H . . ." in the position of the first word.

Look-Up With Juggle Function

As mentioned, the look-up program uses the combinations to search for matches in the data-base. Those combinations that do not match are eliminated. Each input subsequently entered is placed by the juggle function in all the remaining combinations. After an input is placed, another search is executed and more abbreviations may then be eliminated. Ultimately, if the speaker has enough information, the search will be narrowed down to one name.

(Note: A system could allow a speaker to invoke the juggle function after an abbreviation has been rejected for having no matches.)

Interactivity

However, the juggle function may lead to multiple matches even after numerous inputs. Therefore, this function is best combined with an interactive look-up system that guides the speaker. The guides work basically the same way as those described in section 6, except that they have to try more abbreviations.

A question arises. How does the program suggest to the speaker what input to enter when the speaker does not know the word order?

Once the interactive program has selected an input to suggest, the juggle function then finds the word the speaker has entered that corresponds [more] to that input more than any other word the speaker has entered. (We presume the suggested input includes a letter.) The function then suggests to the speaker that he enter the next (or last) letter in that word. Thus the suggested input is translated to apply to the word the speaker identified, though[t] the input actually shows up in various word order combinations created by the juggle function.

The speaker's word identifiers are necessary so that the speaker is able to continue spelling given words, though the position of those words may be inaccurate. The juggle function, combined with the interactive look-up system, ultimately shows the speaker what the accurate word order is.

Does the interactive program suggest a specific input that does not correspond to a word that the speaker has entered? No. In this case, the juggle function outputs no specific word suggestions. It can make a general suggestion such as "Try another word." But it does not ask the speaker to enter letters for words that the speaker has not yet entered.

I claim:

1. An input system employing an automatic speech recognizer that can recognize and confirm words and numbers used as program commands and can recognize and confirm alpha-numeric symbols (the letters of the alphabet and the digits 0–9);

said input system being used for entering search parameters into a data-base system, in order to find names in said data-base;

said input system builds a set of search parameters, called an abbreviation, said abbreviation minimizing the inputs necessary to specify a name in said data-base;

said input system comprising in combination the following elements:

a computer with memory, processor, and output means, along with said speech recognizer as an input means, and a program directing the operation of said input system;

said program enabling the system to accept speech inputs from a speaker speaking into said recognizer, said program enabling the system to distinguish among three sets of inputs:

a. letter inputs that make up words, said letter inputs including the letters of the alphabet and the digits 0–9, b. word identifier inputs that denote the ordinal position of words in a name, each identifier including a different number corresponding to a different ordinal position for a word, each number being used to define a field that identifies which word a speaker's letter inputs correspond to, c. a termination input that signifies that no more letters or word identifiers will be stored in an abbreviation;

said program directing said input system to execute the following steps:

first, waiting for a word identifier to be entered, then, after the entry of said identifier, beginning to build an abbreviation and, storing said word identifier in said abbreviation, after which, if a word identifier is entered, storing it in said abbreviation, if a letter is entered, storing it in said abbreviation in the field defined by the last word identifier entered, if a termination input is entered, storing no more inputs in said abbreviation and returning to the first step above;

said input system being combined with a data-base system provided with search means that use said abbreviation to find a name and data corresponding to said name in said data-base;

said data-base system executing the following steps upon an input being stored in said abbreviation:

searching said data-base for a name uniquely matching said abbreviation, if said abbreviation matches no name, outputting a message saying that no name matches the name being abbreviated, if said abbreviation matches a set of multiple names, outputting no message and waiting for another input to be stored in said abbreviation, if said abbreviation matches one name, outputting said name and data corresponding to said name.

2. The system of claim 1 wherein said program further distinguishes another set of inputs:

said inputs being letter identifier inputs that denote the ordinal position of letters in a word, each identifier including a different number corresponding to a different ordinal position, each number being used to define a field that identifies which position in a word a letter input corresponds to, said program further directing said input system to execute the following steps, if a letter identifier is entered, storing said letter identifier in said abbreviation in the field defined by the last word identifier entered and, if the next input entered is a letter, storing said letter in the field defined by said letter identifier.

3. The system of claim 1 wherein said program further distinguishes another set of inputs:

said inputs being numeric value inputs that denote the number of letters in the word corresponding to the last word identifier entered, each numeric value input including a different number for denoting a different number of letters in a word, said program further directing said input system to execute the following steps, if a numeric value input is entered, storing the number of said numeric value input in said abbreviation in the field defined by the last word identifier entered and, using said number to denote the number of letters in the word corresponding to said word identifier.

4. The system of claim 1 wherein said data-base system is provided with calculation means for calculating an expected information value of letter inputs, said means calculating the percentage of false matches, on average, that inputs eliminate from a set of names being searched, said step, if said abbreviation matches a set of multiple names, further comprising, checking if the number of letters stored in said abbreviation is above a threshold, if no, outputting no message and waiting for another input to be stored in said abbreviation, if yes, taking the set of matched names, from this set, taking the set of all the words corresponding to the last word identifier entered, setting a string length, N, calculating the expected value of the next N letters in all the words taken, if the expected value is below a threshold, outputting a message that little progress will be made by spelling the word corresponding to the last word identifier entered, if the expected value is not below the threshold, outputting no message and waiting for another input to be stored in said abbreviation.

5. The system of claim 1 wherein said data-base system is provided with calculation means for calculating an expected information value word identifier and letter inputs, and further provided with a stored set of word identifier and letter inputs called suggested inputs, said means calculating the percentage of false matches, on average, that inputs eliminate from a set of names being searched, said step, if said abbreviation matches a set of multiple names, further comprising, calculating the expected information value of each input in the set of suggested inputs, finding the suggested input with the highest expected value, checking if said highest expected value is above a threshold, if no, outputting no message and waiting for another input to be stored in said abbreviation, if yes, outputting a message suggesting the entering of the input corresponding to said highest expected value.

* * * * *